US010719650B1

(12) United States Patent
Sanders et al.

(10) Patent No.: US 10,719,650 B1
(45) Date of Patent: Jul. 21, 2020

(54) HIERARCHICAL DYNAMIC HEAT MAPS IN FULL CUSTOM EDA APPLICATIONS

(71) Applicant: Synopsys, Inc., Mountain View, CA (US)

(72) Inventors: Jonathan Sanders, Mountain View, CA (US); Salem Lee Ganzhorn, Apex, NC (US); Donald John Oriordan, Mountain View, CA (US); Yevgenia Murad Beglaryan, Yerevan (AM); Liana Badalyan, Yerevan (AM)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/215,272

(22) Filed: Dec. 10, 2018

Related U.S. Application Data

(60) Provisional application No. 62/599,941, filed on Dec. 18, 2017.

(51) Int. Cl.
*G06F 30/30* (2020.01)
*G06F 30/39* (2020.01)

(52) U.S. Cl.
CPC .................................. *G06F 30/39* (2020.01)

(58) Field of Classification Search
CPC ............................ G06F 17/5068; G06F 30/39
USPC ........................................................ 716/139
See application file for complete search history.

(56) References Cited

U.S. PATENT DOCUMENTS

| 8,427,502 | B2 * | 4/2013 | Choudhary | ......... G06F 17/5045 345/619 |
| 8,533,626 | B2 * | 9/2013 | Majumder | .......... G06F 17/5068 715/802 |
| 8,640,078 | B2 * | 1/2014 | Majumder | .............. G06F 3/048 716/139 |
| 8,640,079 | B2 * | 1/2014 | Majumder | .............. G06F 17/50 716/100 |
| 8,645,901 | B2 * | 2/2014 | Majumder | .......... G06F 17/5086 715/210 |
| 10,223,495 | B1 * | 3/2019 | Agrawal | .............. G06F 17/5081 |
| 2004/0117750 | A1 * | 6/2004 | Skoll | ................... G06F 17/5081 716/111 |
| 2007/0083826 | A1 * | 4/2007 | Pessetto | .................. G06F 17/50 715/800 |

(Continued)

OTHER PUBLICATIONS

Becker, et al., "Visualizing Network Data," IEEE Transactions on Visualization and Computer Graphics, vol. 1, No. 1, pp. 16-21, (Mar. 1995).

(Continued)

*Primary Examiner* — Stacy Whitmore
(74) *Attorney, Agent, or Firm* — Alston & Bird LLP

(57) ABSTRACT

Systems and method for generating graphical visualizations of an integrated circuit (IC) design may comprise configurations for generating interactive graphical visualizations of the IC design configured for providing informative overlays to the graphical visualizations based on a selected zoom level of the graphical visualization. In certain embodiments, the graphical overlays may be generated over corresponding objects for providing information regarding hierarchies of objects, or for generating perceptible overlays over objects regardless of a zoom level of the interactive graphical visualization.

Figure 1:
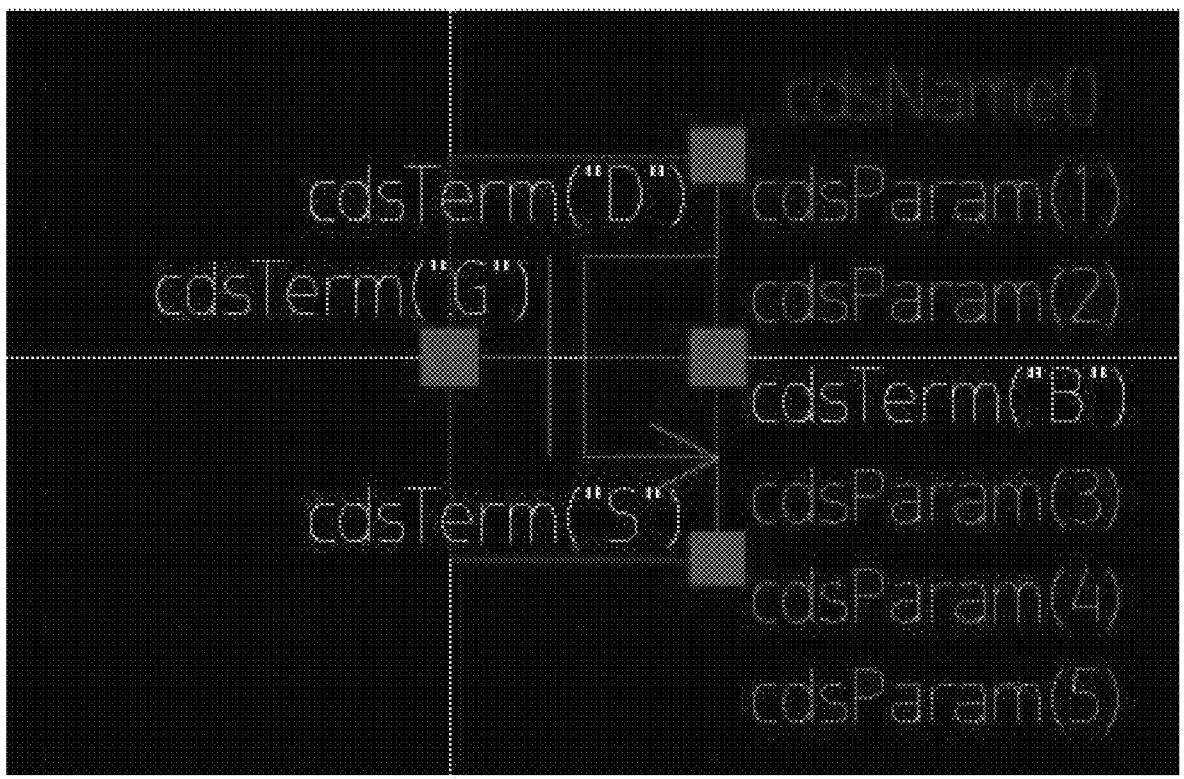

21 Claims, 50 Drawing Sheets
(47 of 50 Drawing Sheet(s) Filed in Color)

(56) References Cited

U.S. PATENT DOCUMENTS

| | | | |
|---|---|---|---|
| 2008/0005713 A1* | 1/2008 | Singh | G06F 17/5045 716/102 |
| 2010/0037136 A1* | 2/2010 | Choudhary | G06F 17/5045 715/708 |
| 2010/0223032 A1* | 9/2010 | Reghetti | G06T 19/20 703/1 |
| 2011/0043517 A1* | 2/2011 | Schneider | G06F 17/50 345/419 |
| 2011/0185325 A1* | 7/2011 | Stellari | G06F 17/5022 716/106 |
| 2011/0219320 A1* | 9/2011 | Majumder | G06F 3/048 715/763 |
| 2011/0219352 A1* | 9/2011 | Majumder | G06F 17/50 716/139 |
| 2014/0258940 A1* | 9/2014 | Han | G06F 3/0484 715/854 |
| 2015/0120265 A1* | 4/2015 | Amirav-Drory | G06F 17/50 703/11 |
| 2015/0331969 A1* | 11/2015 | Dahlen | G06F 17/50 703/1 |
| 2018/0253509 A1* | 9/2018 | Dahlen | G06F 17/50 |
| 2019/0107940 A1* | 4/2019 | Wynne, IV | G06F 3/04845 |
| 2019/0188350 A1* | 6/2019 | Sarli | G06F 17/2288 |

OTHER PUBLICATIONS

Lemieux, et al., "Visualization techniques for program," Defence R & D Canada—Valcartier, Technical Memorandum, DRDC Valcartier TM 2005-535, (Feb. 2006).

Nacif, et al., "Tracking Hardware Evolution," IEEE, $12^{th}$ Int'l Symposium on Quality Electronic Design, pp. 442-447, (2011).

\* cited by examiner

HIERARCHICAL DYNAMIC HEAT MAPS IN FULL CUSTOM EDA APPLICATIONS

CROSS-REFERENCE TO RELATED APPLICATIONS

This patent application claims priority from U.S. Provisional Patent Appl. Ser. No. 62/599,941, filed Dec. 18, 2017, which is incorporated herein by reference in its entirety.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

BACKGROUND—DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

BACKGROUND

The standard mechanism for 'back annotating' data onto design schematics etc. in full custom design tools is via the use of interpreted 'placeholder' labels. When rendering a design schematic and 'annotating' values, the placeholder label text is substituted with the values of interest. For example, different schematic symbols typically have various placeholder labels associated with them, the values for which can be substituted on a per-occurrence basis when rendering the design. The back annotation via labels approach works relatively well for very small designs (even if all the parameters cannot be seen at the same time), but has numerous disadvantages particularly for large designs. When a design is 'fit' into the available canvas space, or viewed at anything other than a very low altitude zoom level, it becomes very difficult to read the labels. In larger designs, it will be typical for the user to zoom out even further to see the full connectivity in a single canvas page. At this point, the software doesn't even attempt to display the labels. The results are such that to see the full design, the user cannot read any labels.

To read the labels, the designer must zoom in to a magnification level where they become visible, at which point the user usually cannot see the full design any longer. The user must now resort to multiple, and wasteful zoom and/or pan operations to see the design labels in the context of the design itself.

Further, the user has little idea which devices are the most "interesting" i.e. have the most extreme values (largest or smallest) for the various properties being back annotated. The user must inspect each device and then remember the corresponding values and locations, or else look in a tabular (non-canvas) report.

Further, if the design contains any hierarchy (most do these days), then with the interpreted labels scheme of the prior art, the designer can only see the values for the current hierarchical level displayed within the schematic canvas. The designer now must navigate around the design (descend, ascend operations in the canvas) hierarchy to see the values being annotated at each level, and still has little sense as to where the outlier or "interesting" values are, and again must consult a tabular report. Full custom circuit designers prefer to interact mainly with the schematic canvas, and seek graphical means to see the most extreme values for values being back annotated.

There is a need for a graphical solution that allows the designers to easily get a sense of the data (magnitude values), and where the outliers are, and where in the design hierarchy they exist, and to be able to do so without excessive zoom/pan/navigation operations being required.

There is a need for a solution that presents the user with the 'bigger' picture, so that they can get a sense of the magnitude of the data values being displayed while zoomed out to a high altitude, i.e. a need for a high-altitude solution that helps the user quickly understand where to zoom and/or navigate to see the detail.

SUMMARY

The claims signify a brief description of one or more of the innovations, embodiments, and/or examples found within this disclosure.

In some of the embodiments disclosed herein, traditional heat map techniques are made more efficient and useful in commerce which make it possible to use such techniques in the complicated context of large EDA designs which may be hierarchical designs and/or contain vectorized instances or nets.

In some of the embodiments disclosed herein, heat map techniques are made more efficient and useful in commerce by integrating relational database technologies to perform fast queries and identify/color-code objects matching specific conditions. Unlike traditional heat maps, some of the embodiments disclosed herein include an aggregation method that also allows for multiple quantities to be considered at the same time, and allow extreme-value bearing objects to be readily identified, even in large and/or hierarchical designs.

In some of the embodiments disclosed herein, methods are provided to draw the heatmap at different zoom altitudes, ensuring objects of interest are still readily identifiable even at extremely high zoom altitudes. Filter limits allow for certain data values to be excluded from heatmap display consideration, making it easier for a user to identify 'interesting' EDA design objects in large designs.

In some of the embodiments disclosed herein, an Application Programming Interface (API) allows additional heatmap applications to be constructed via customization.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

Certain embodiments are directed to a system for generating a graphical visualization of an integrated circuit (IC) design. In certain embodiments, the system comprises: one or more memory storage areas; and one or more processors collectively configured to: generate a graphical representation of an IC design comprising a plurality of objects visible within differing zoom level hierarchies; apply one or more visual overlays over one or more of the plurality of objects based at least in part on user input selecting one or more parameters of interest; and for a plurality of visually proximate objects existing within different zoom level hierarchies, selected from the plurality of objects, select a visual overlay for display relevant to a single one of the plurality of visually proximate objects, wherein the single one of the plurality of visually proximate objects satisfies a defined criteria relating to at least one of the one or more parameters of interest.

In various embodiments, the single one of the plurality of visually proximate objects is identified as associated with a value identified as an outlier for one or more of the parameters of interest. Moreover, in certain embodiments, the one or more parameters of interest comprise a plurality of parameters of interest, and wherein the single one of the plurality of visually proximate objects satisfies a defined criteria relating to a worst-case value in one of the plurality of parameters of interest. In certain embodiments, the one or more visual overlays are sized based on a size of one or more of the plurality of objects. The one or more visual overlays may be sized based at least in part on a minimum overlay size. In various embodiments, the plurality of visually proximate objects comprise at least one net. Moreover, at least a portion of the plurality of objects may be represented within a hierarchical symbol comprising the at least a portion of the plurality of objects.

Certain embodiments are directed to a method for generating a graphical visualization of an IC design. In various embodiments, the method comprises: generating a graphical representation of an IC design comprising a plurality of objects visible at differing zoom level hierarchies, applying one or more visual overlays over one or more of the plurality of objects based at least in part on user input selecting one or more parameters of interest; and for a plurality of visually proximate objects existing within different zoom level hierarchies, selected from the plurality of objects, selecting a visual overlay for display relevant to a single one of the plurality of visually proximate objects, wherein the single one of the plurality of visually proximate objects satisfies a defined criteria relating to at least one of the one or more parameters of interest.

In certain embodiments, the single one of the plurality of visually proximate objects is identified as associated with a value identified as an outlier for one or more of the parameters of interest. In various embodiments, the one or more parameters of interest comprise a plurality of parameters of interest, and wherein the single one of the plurality of visually proximate objects satisfies a defined criteria relating to a worst-case value in one of the plurality of parameters of interest. Moreover, the one or more visual overlays may be sized based on a size of one or more of the plurality of objects. The plurality of visually proximate objects may comprise at least one net. In certain embodiments, at least a portion of the plurality of objects are represented within a hierarchical symbol comprising the at least a portion of the plurality of objects.

Various embodiments are directed to a computer-implemented method for generating a graphical visualization of an IC design. In various embodiments, the method may comprise: generating an interactive graphical representation of an IC design comprising a plurality of objects within a graphical display, wherein the interactive graphical representation of the IC design comprises one or more first visual overlays over one or more of the plurality of objects and wherein the one or more first visual overlays have a first size corresponding to the one or more of the plurality of objects; receiving user input zooming the interactive graphical representation of the IC design to a high-altitude zoom level; and dynamically reconstructing the interactive graphical representation of the IC design to have one or more second visual overlays over the one or more of the plurality of objects, wherein the one or more second visual overlays have a second size larger than the one or more of the plurality of objects represented in the dynamically reconstructed interactive graphical representation.

In certain embodiments, dynamically reconstructing the interactive graphical representation of the IC design comprises shrinking each of the plurality of objects relative to the graphical display. In various embodiments, the second size of the one or more second visual overlays are selected based at least in part on a minimum visual overlay size. Moreover, the method may further comprise: selecting a second visual overlay for display relative to a single one of a plurality of visually proximate objects within the dynamically reconstructed interactive graphical representation of the IC design, wherein the single one of the plurality of visually proximate objects satisfies a defined criteria relating to at least one of the one or more parameters of interest.

In certain embodiments, the method further comprises: selecting a particular visual overlay for display relative to a single one of a plurality of visually proximate objects within the dynamically reconstructed interactive graphical representation of the IC design, wherein the single one of the plurality of visually proximate objects satisfies a defined criteria relating to at least one of the one or more parameters of interest; generating one or more ancillary visual overlays for display relative to corresponding ones of the plurality of visually proximate objects; and layering the particular visual overlay over the one or more ancillary visual overlays in the graphical display.

Various embodiments are directed to a system for generating a graphical visualization of an IC design. In certain embodiments, the system comprises: one or more memory storage areas; and one or more processors collectively configured to: generate a high-altitude graphical representation of an IC design comprising a plurality of objects; apply one or more visual overlays over one or more of the plurality of objects based at least in part on user input selecting one or more parameters of interest by: generating a visual overlay component having a defined size; and overlaying the visual overlay over a portion of the graphical representation, wherein the visual overlay is centered relative to the one or more of the plurality of objects.

In various embodiments, the plurality of objects comprise a plurality of visually proximate objects, and wherein: applying one or more visual overlays further may comprise: select a visual overlay for display relative to a single one of the plurality of visually proximate objects, wherein the single one of the plurality of visually proximate objects satisfies a defined criteria relating to at least one of the one or more parameters of interest.

In certain embodiments, the plurality of objects comprise a plurality of visually proximate objects, and wherein: applying one or more visual overlays further comprises: select a first visual overlay for display relative to a first one of the plurality of visually proximate objects, wherein the first one of the plurality of visually proximate objects satisfies a defined criteria relating to at least one of the one or more parameters of interest; generate one or more second visual overlays for display relative to corresponding ones of the plurality of visually proximate objects; and layer the first visual overlay over the one or more second visual overlays in the graphical display.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The patent or application file contains at least one drawing executed in color. Copies of this patent or patent application publication with color drawing(s) will be provided by the Office upon request and payment of the necessary fee.

The following Detailed Description, Figures, and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Various figures are incorporated herein. In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

FIG. 1 signifies a symbol view of an N-type metal-oxide-semiconductor (NMOS) transistor.

Figure 2:
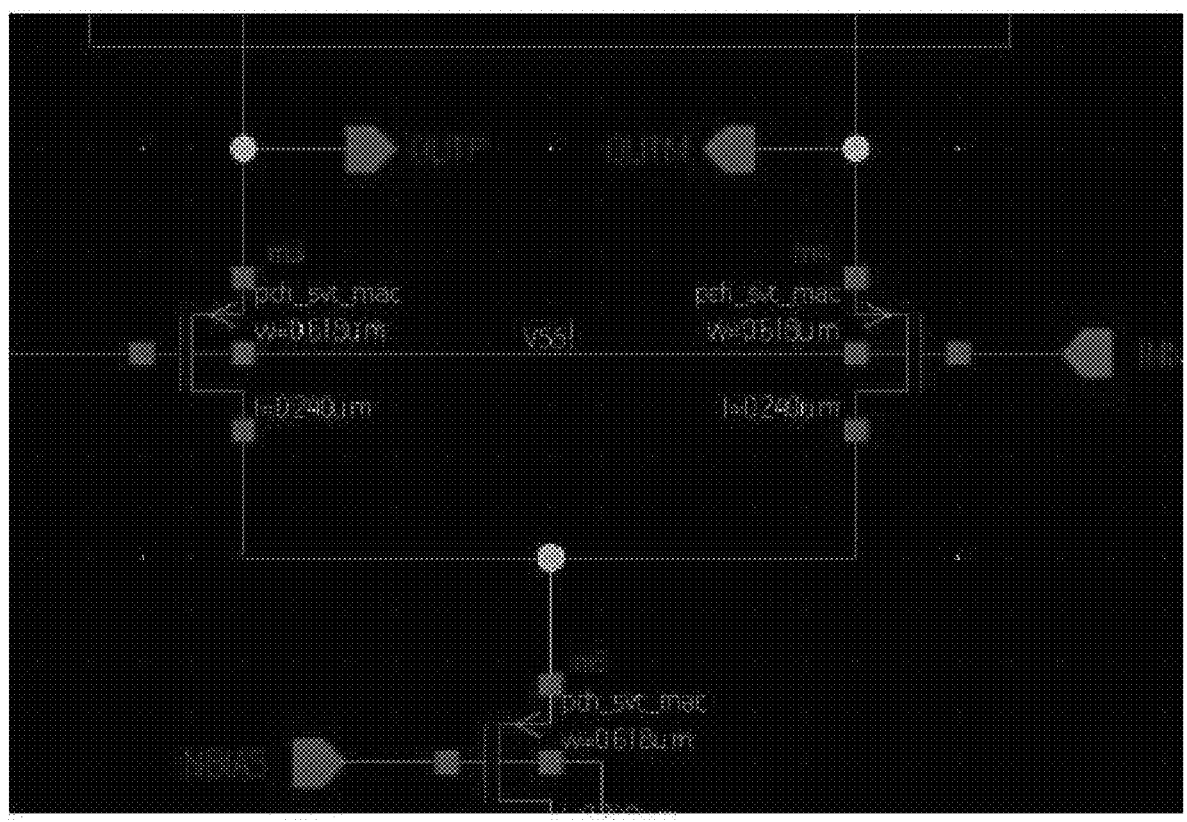

FIG. 2 signifies a circuit schematic showing a default annotation.

Figure 3:
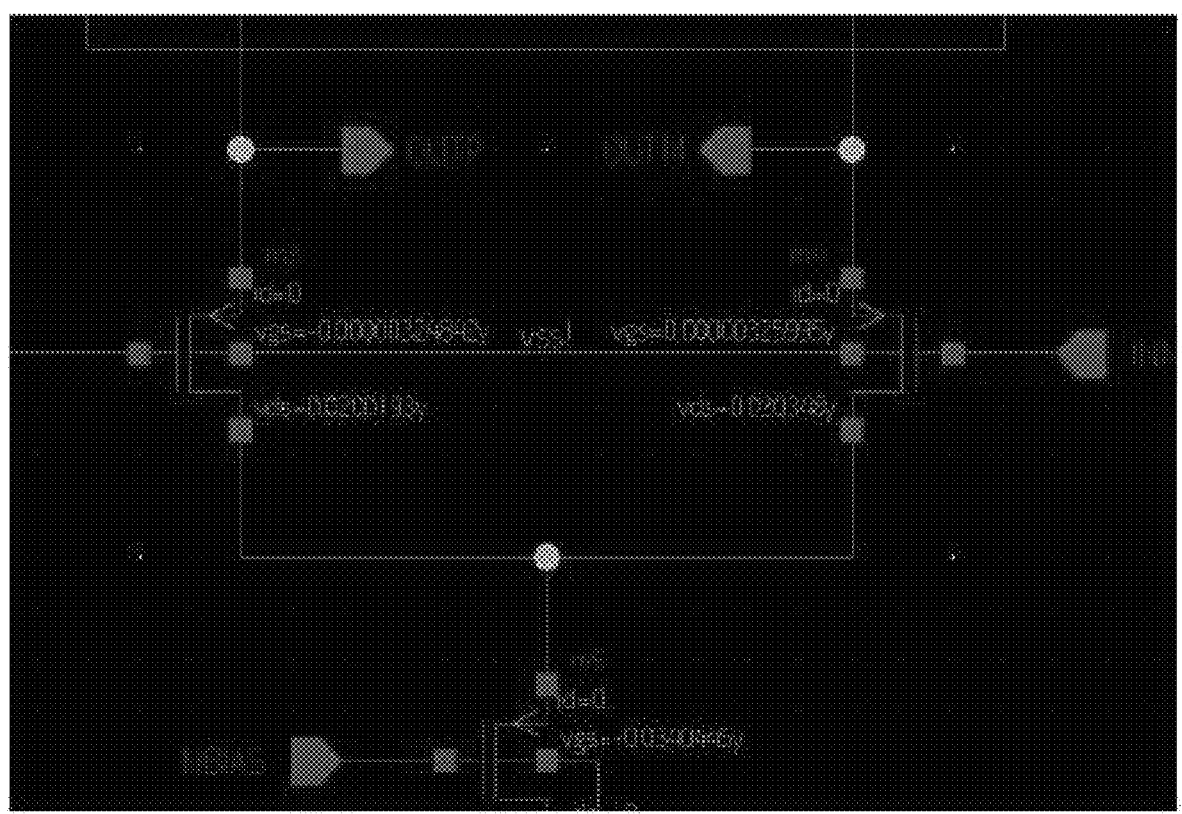

FIG. 3 signifies a circuit schematic showing a back-annotated DC operating point.

Figure 4:
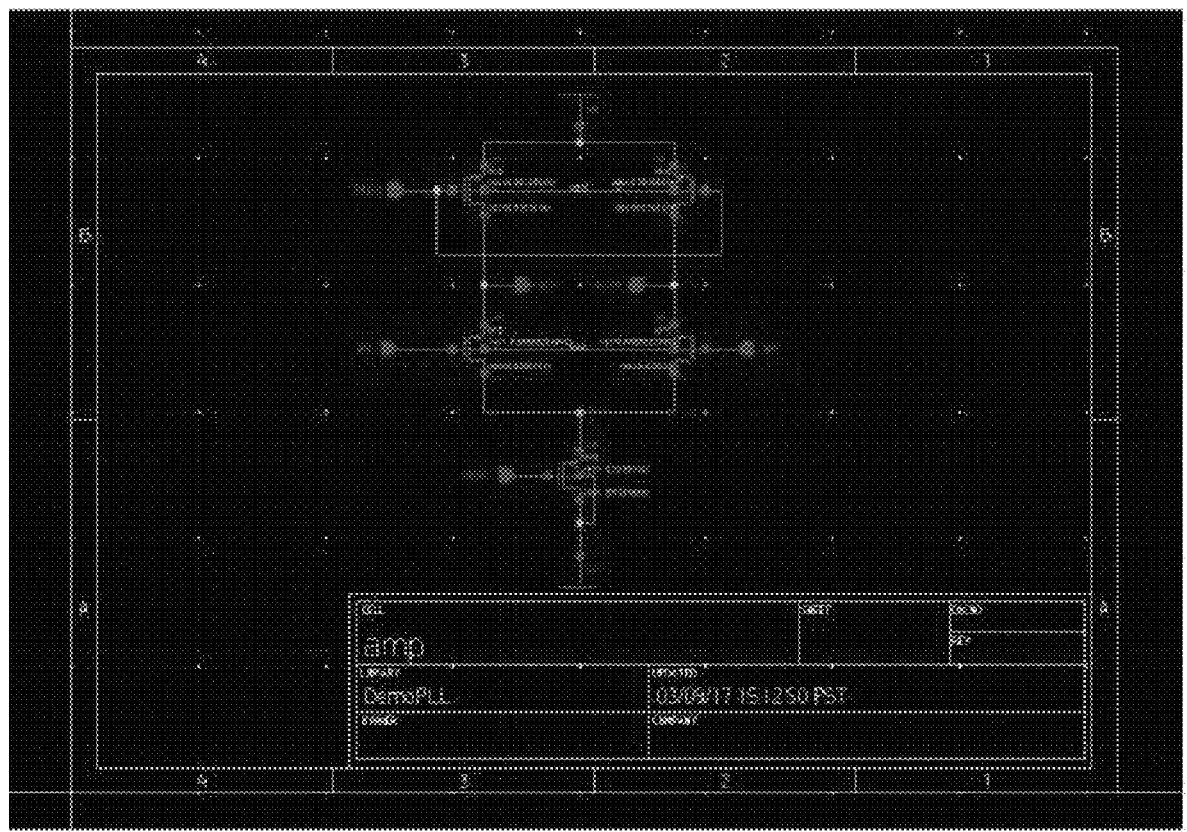

FIG. 4 signifies a circuit schematic design with barely legible back-annotated operating point information.

Figure 5:
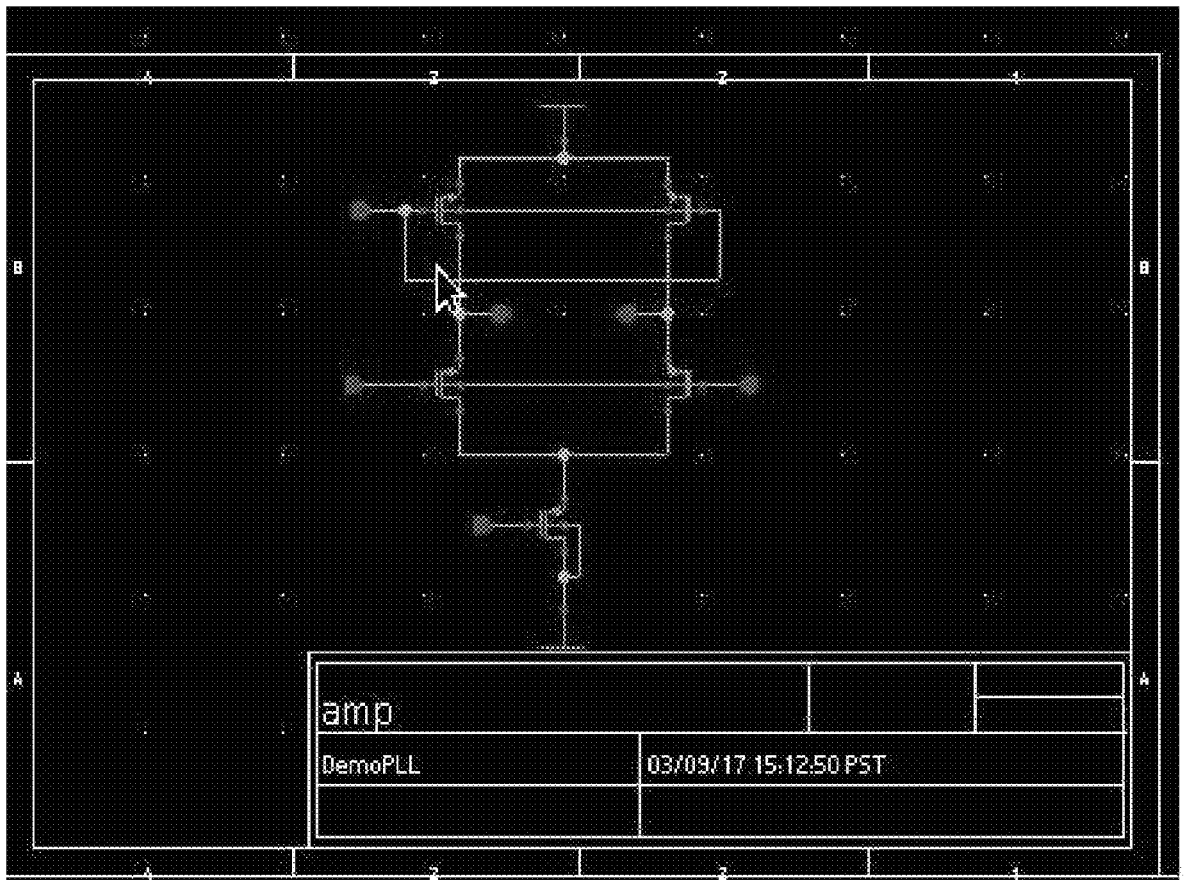

FIG. 5 signifies a zoomed-out version of FIG. 4, with no labels displayed.

Figure 6:
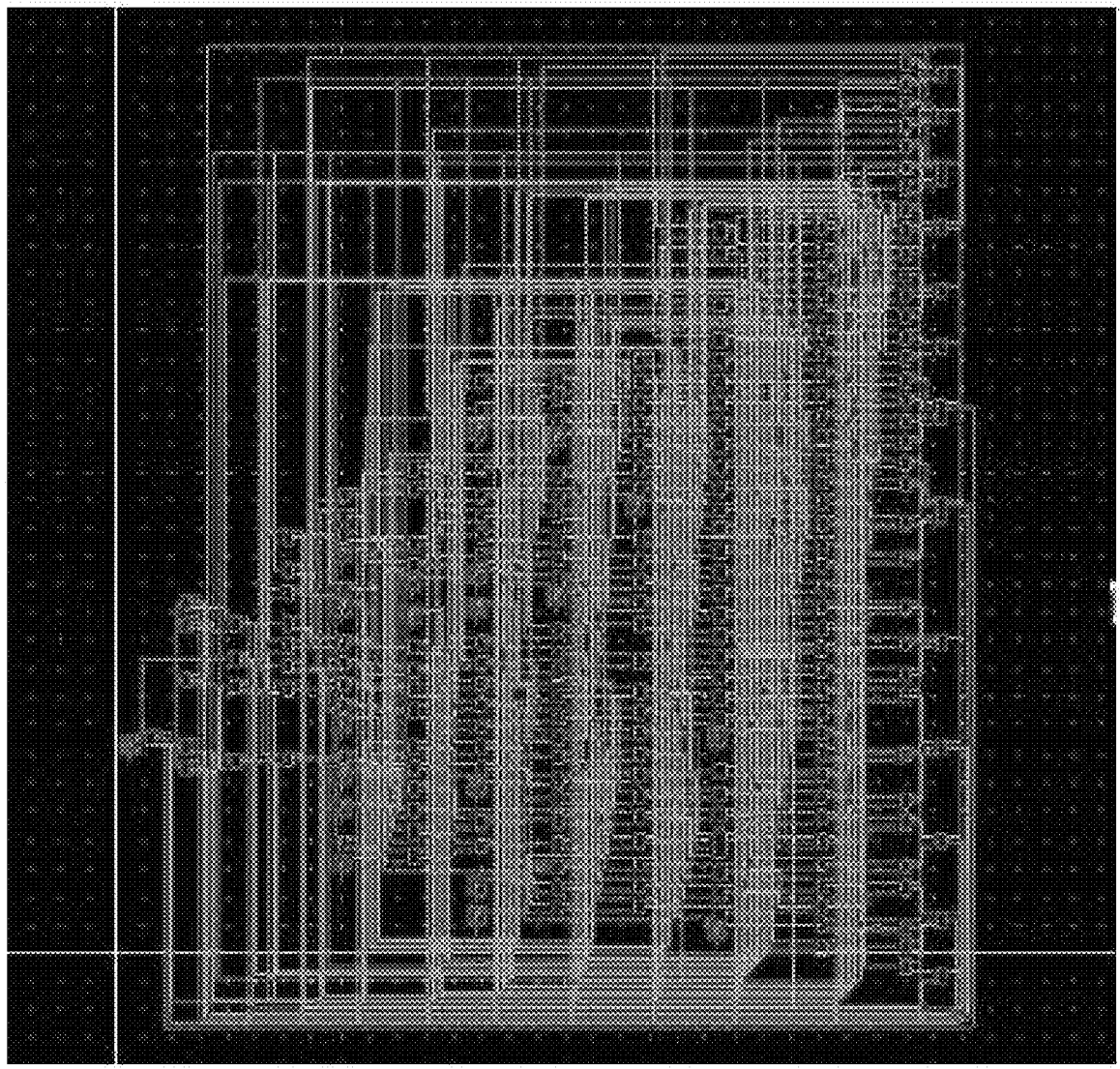

FIG. 6 signifies a large, dense circuit schematic, with no labels displayed.

Figure 7:
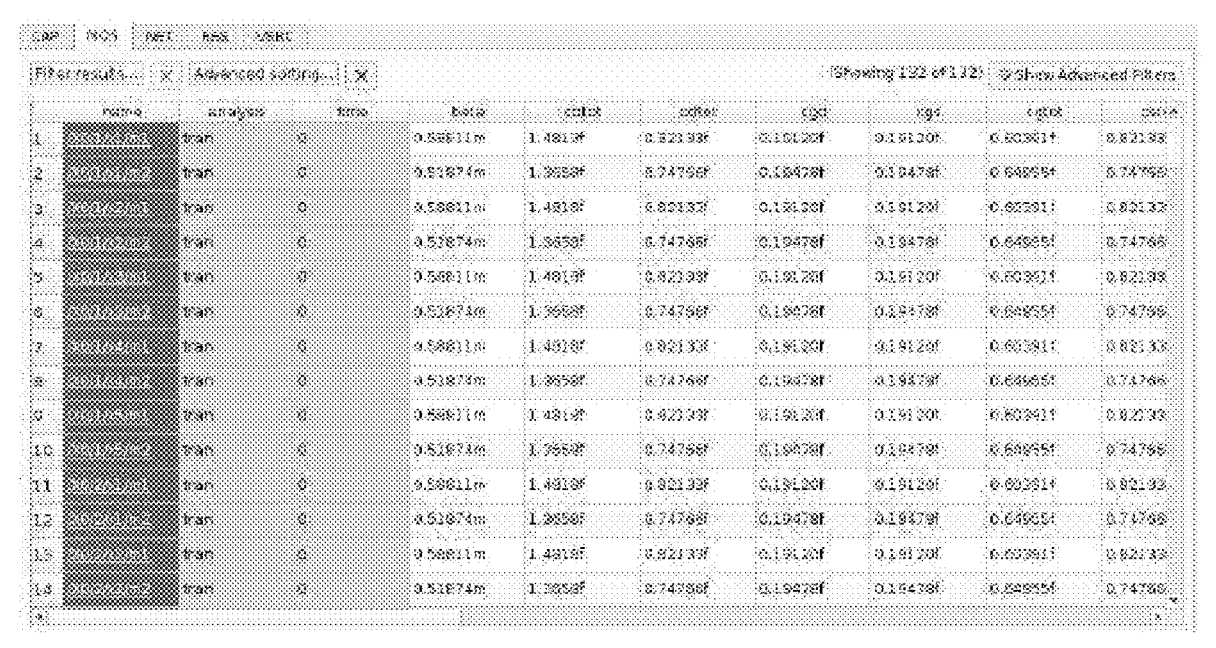

FIG. 7 signifies a table for visualizing transistor data values.

Figure 8:
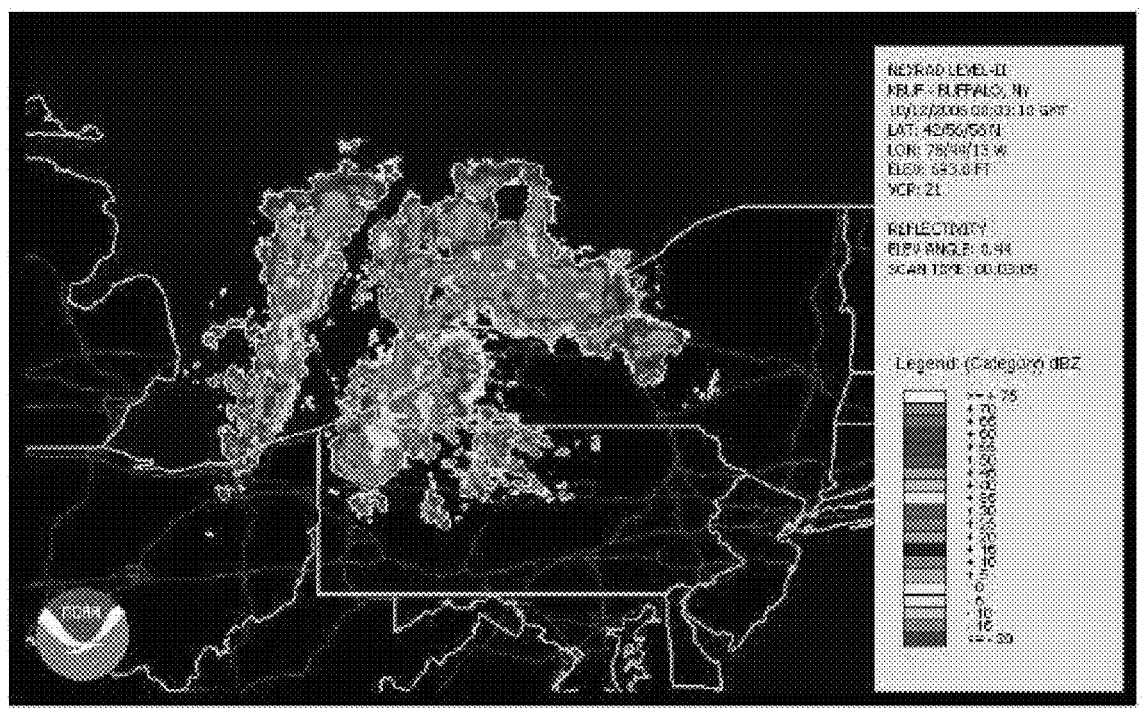

FIG. 8 signifies a heat map for displaying information about weather conditions.

Figure 9:
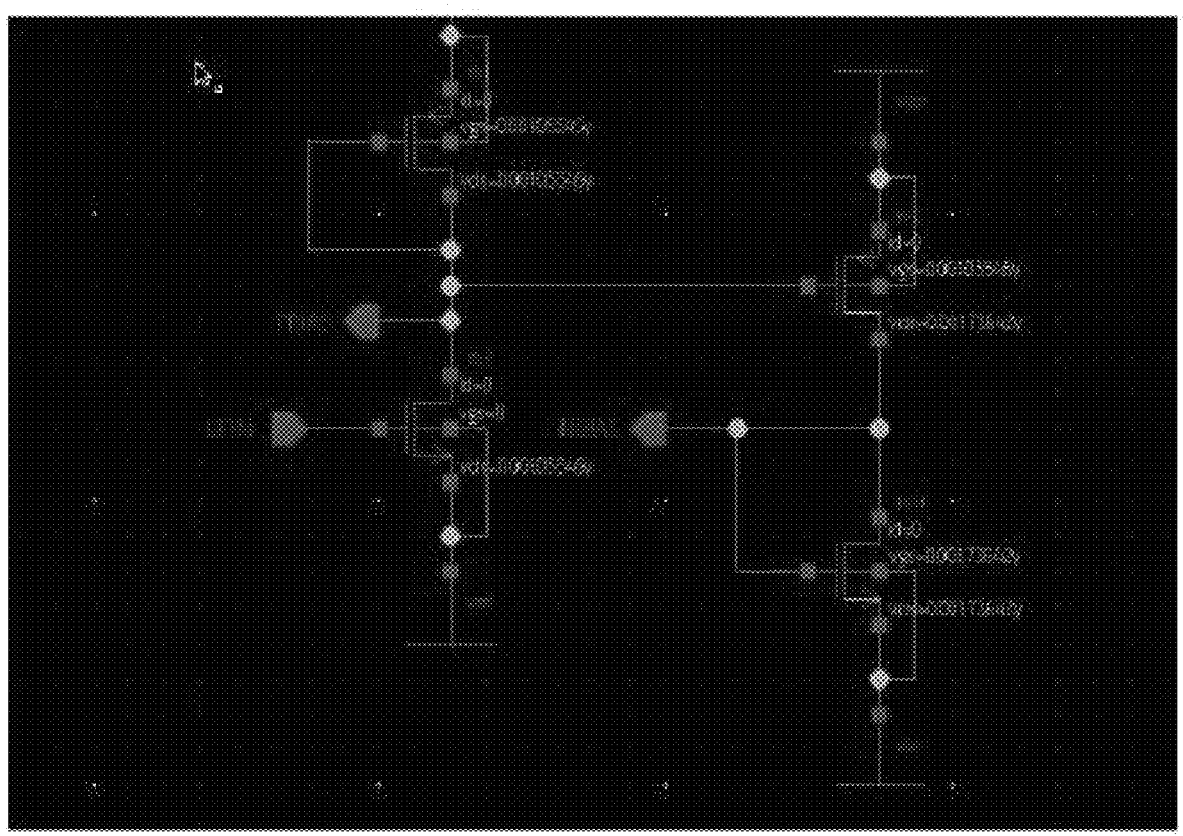

FIG. 9 signifies a position of a circuit design hierarchy, with no heat map information.

Figure 10:
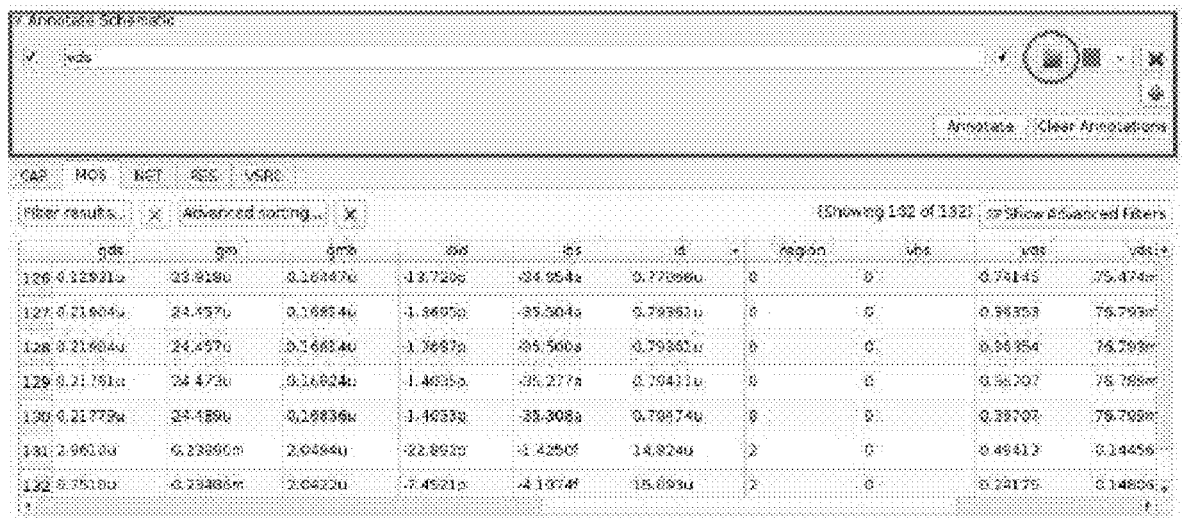

FIG. 10 signifies a table of gradient setup parameters for 'vds' back-annotation.

Figure 11:
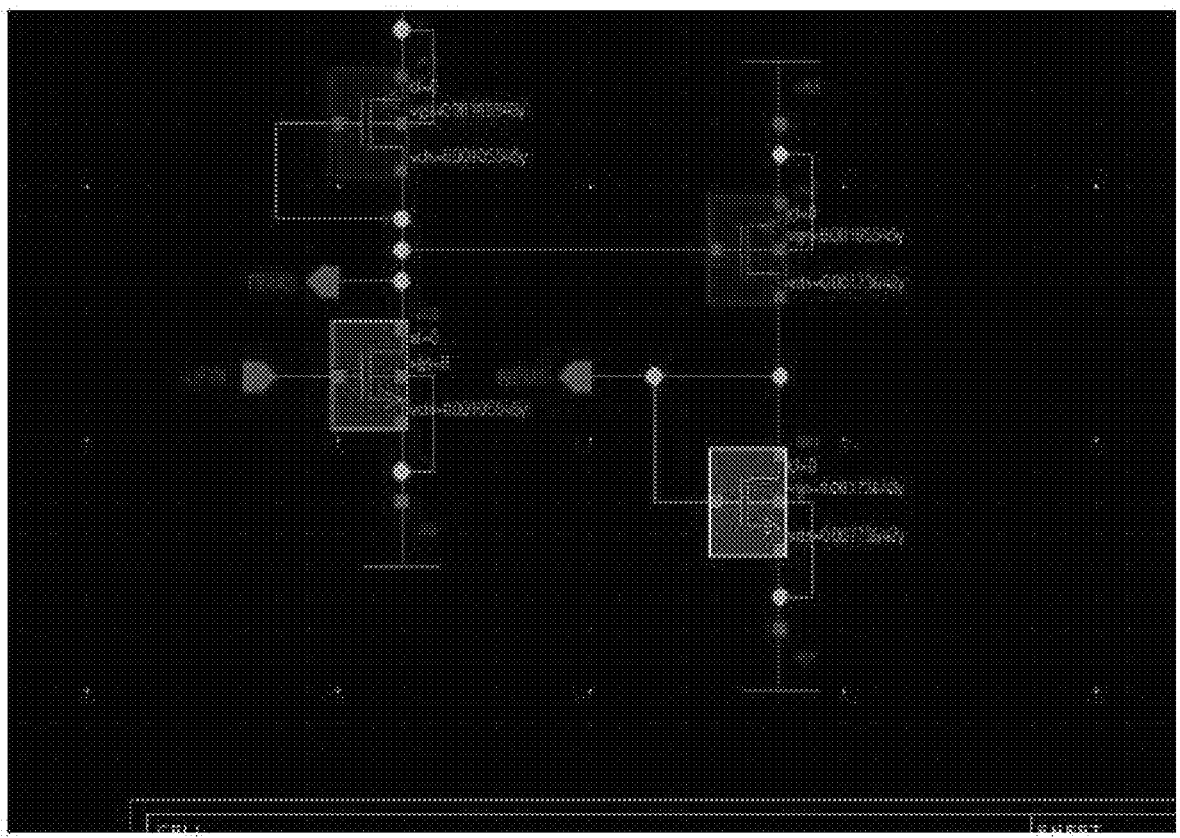

FIG. 11 signifies a circuit schematic with a 'vds' parameter heat map.

Figure 12:
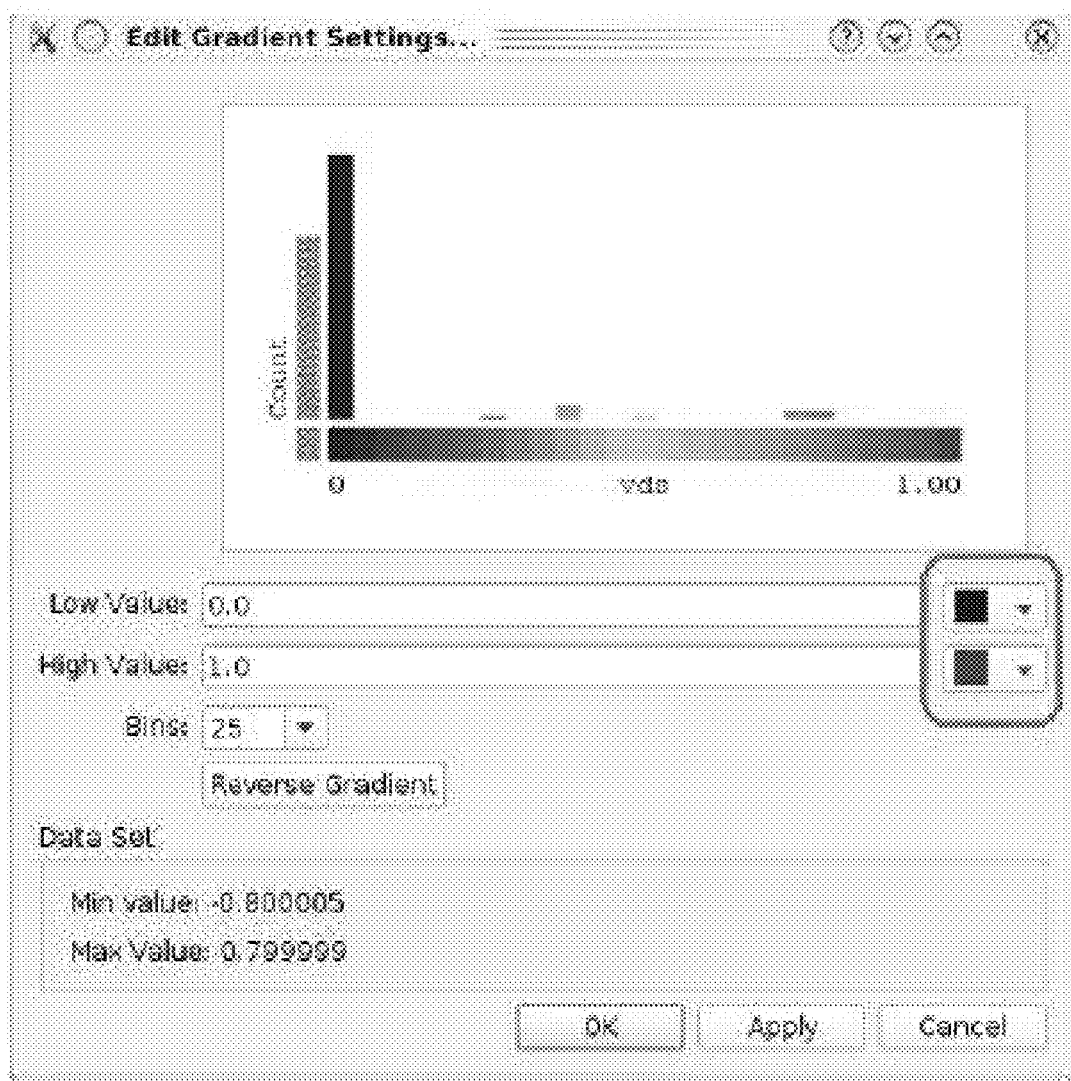

FIG. 12 signifies a dialog box for editing gradient settings.

Figure 13A:
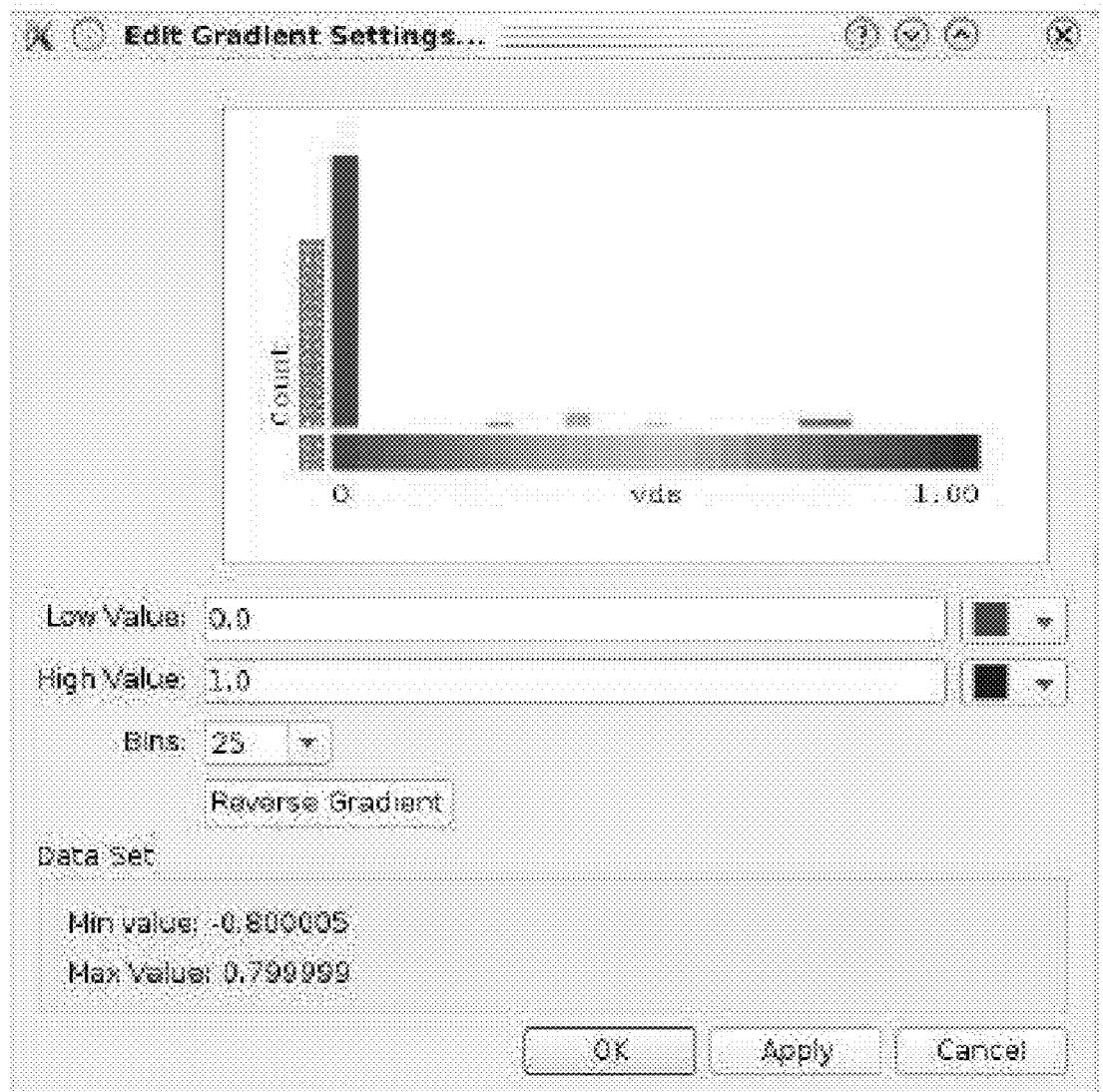

FIG. 13A signifies heat map parameters for using a reverse gradient.

Figure 13B:
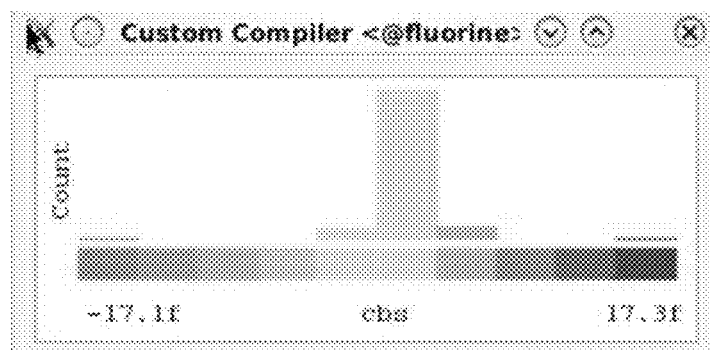
Figure 13C:
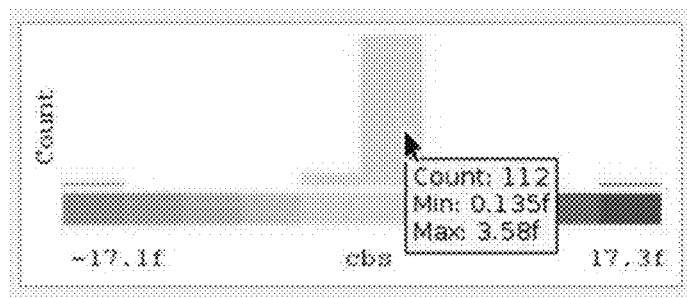
Figure 13D:
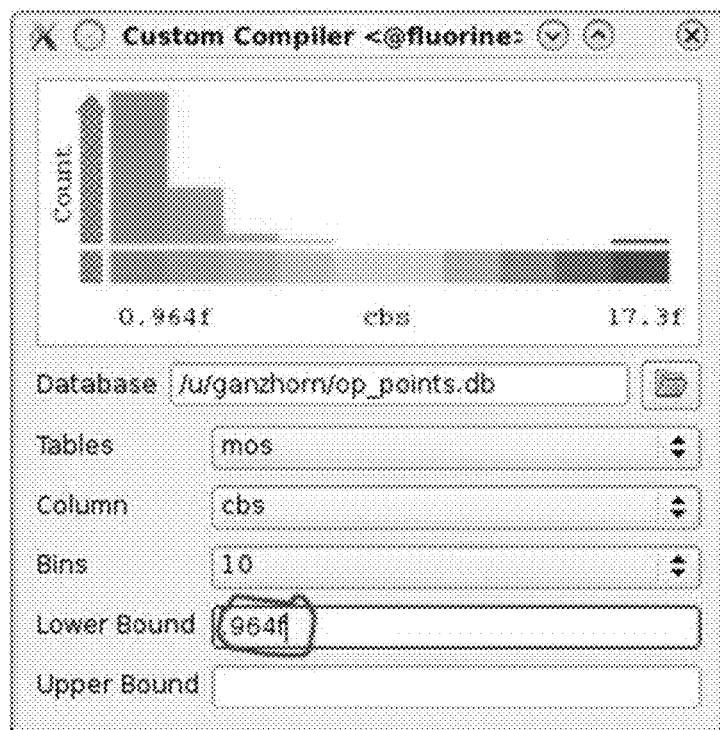

FIGS. 13B-13D illustrate heat map parameters for a custom color scaling.

Figure 14:
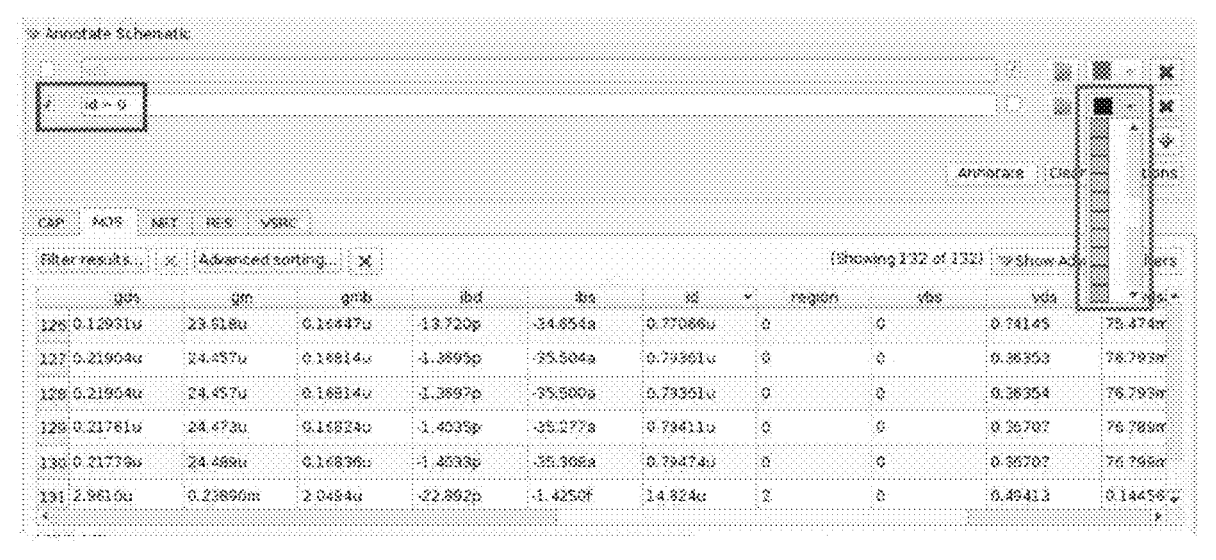

FIG. 14 signifies a table to specify a discrete expression color map for 'id>0'.

Figure 15:
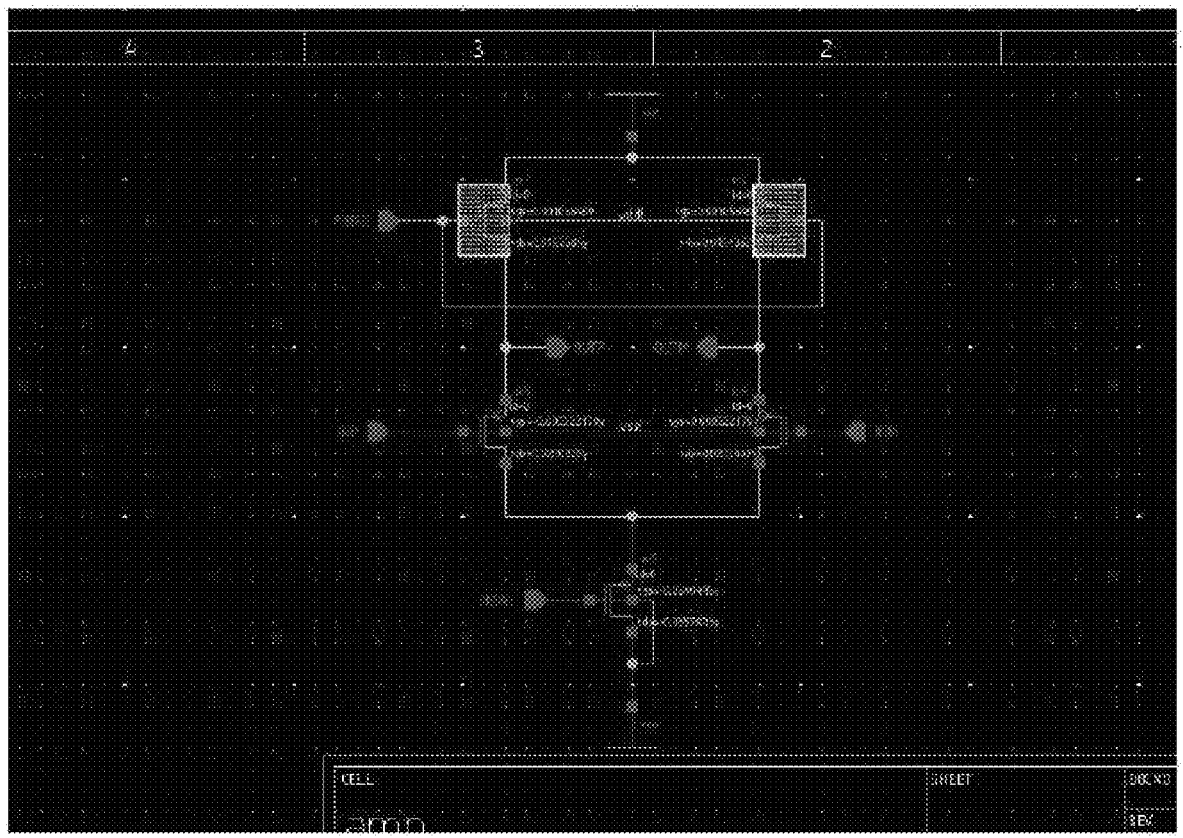

FIG. 15 Signifies a circuit schematic with expression 'id>0' color highlighting.

Figure 16:
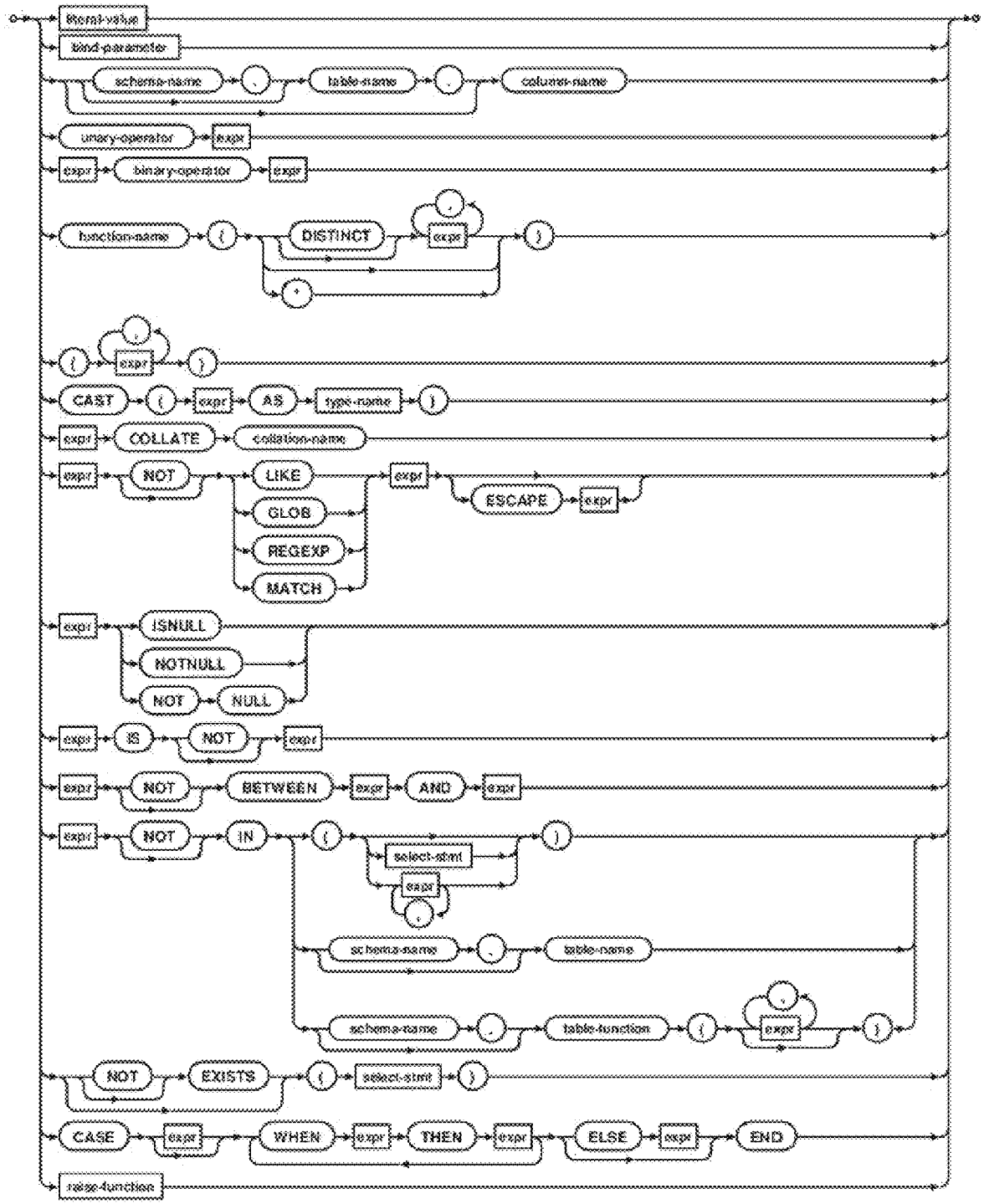

FIG. 16 signifies a BNF grammar for an SQLite3 expression language.

Figure 17:
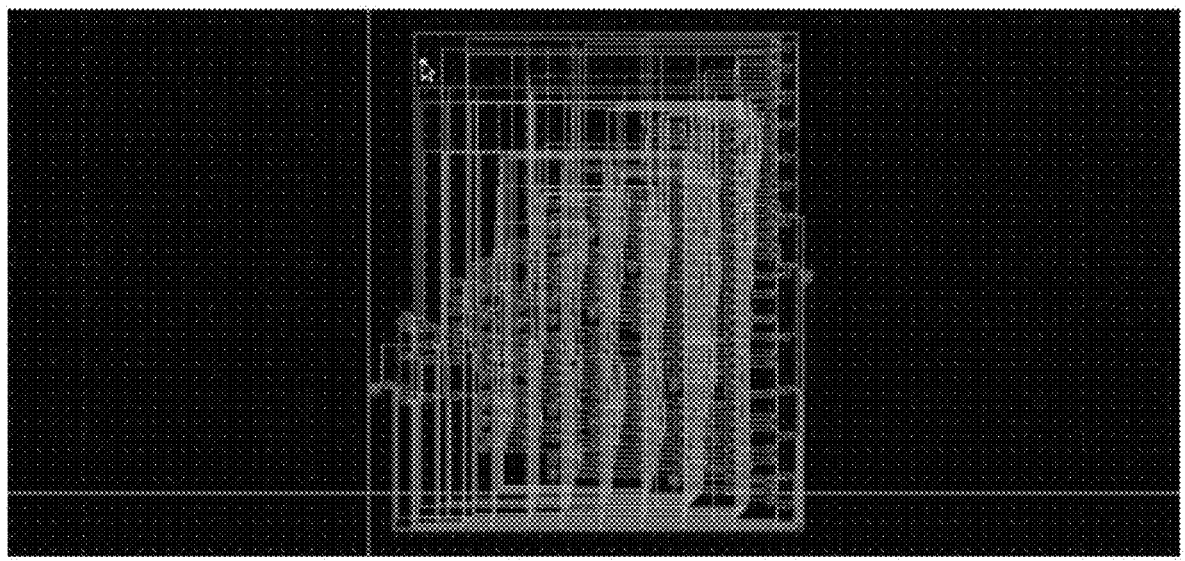

FIG. 17 signifies a medium altitude zoom in a circuit design containing many instances.

Figure 18:
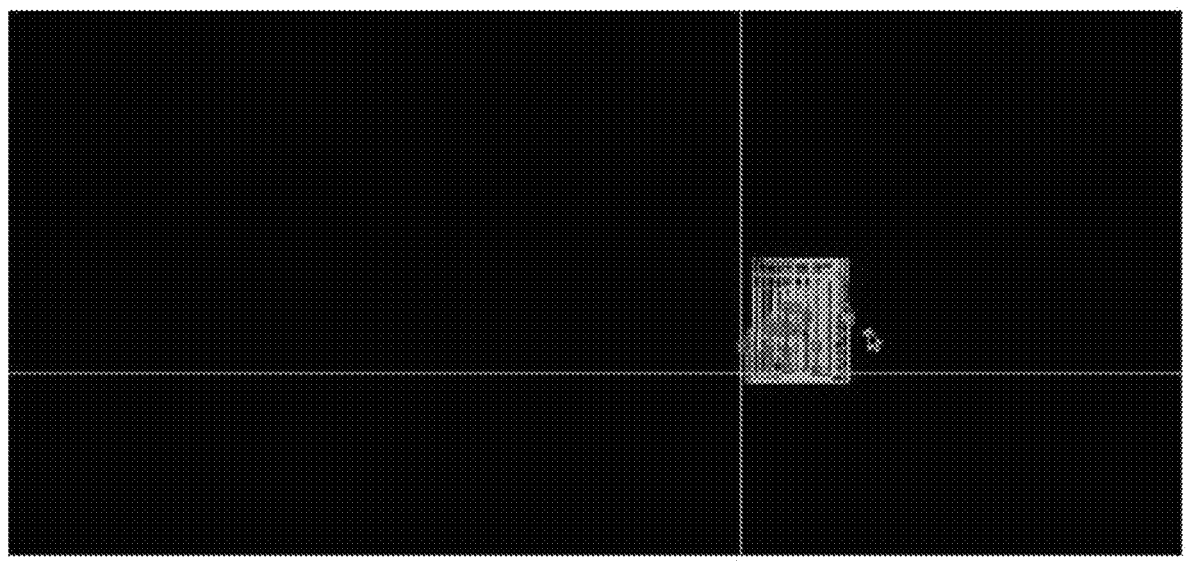

FIG. 18 signifies a high altitude zoom in a circuit design containing many instances.

Figure 19:

FIG. 19 signifies a very high altitude zoom in a circuit design containing many instances.

Figure 20:
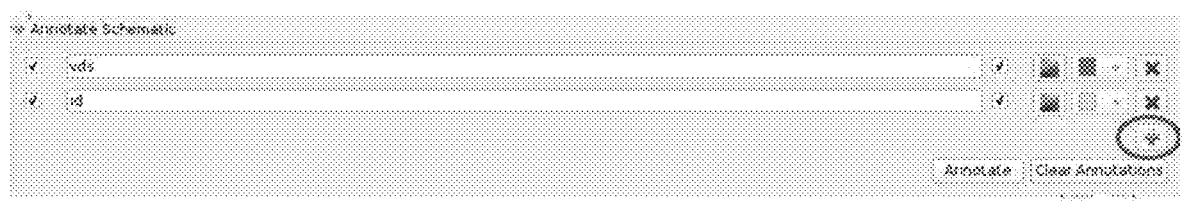

FIG. 20 signifies parameters for a heat map setup for two quantities.

Figure 21:
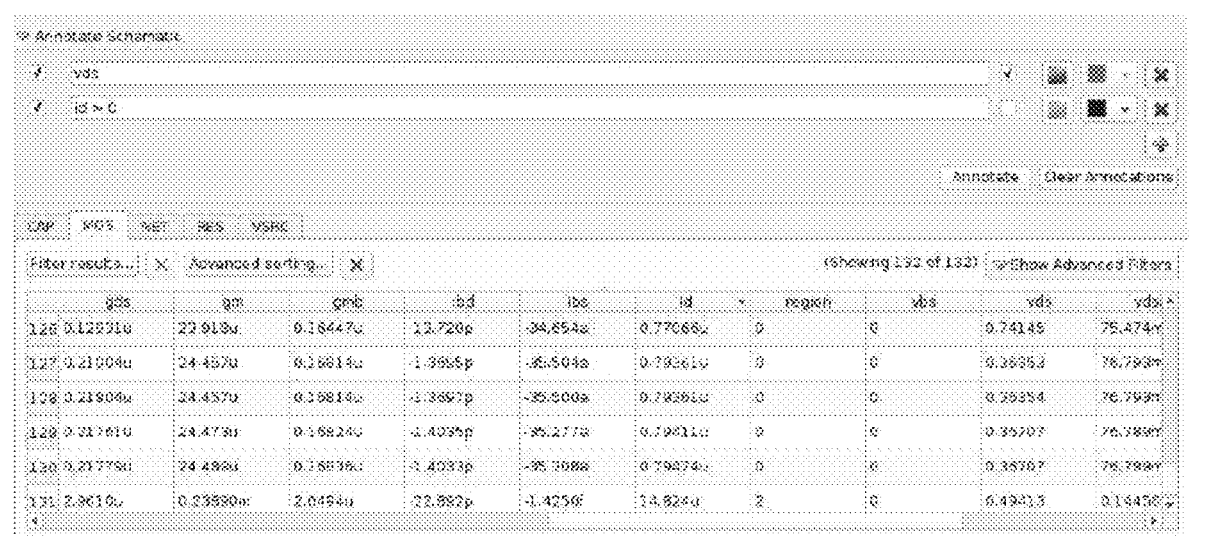

FIG. 21 signifies a table of data relating to a heat map for two quantities.

Figure 22:
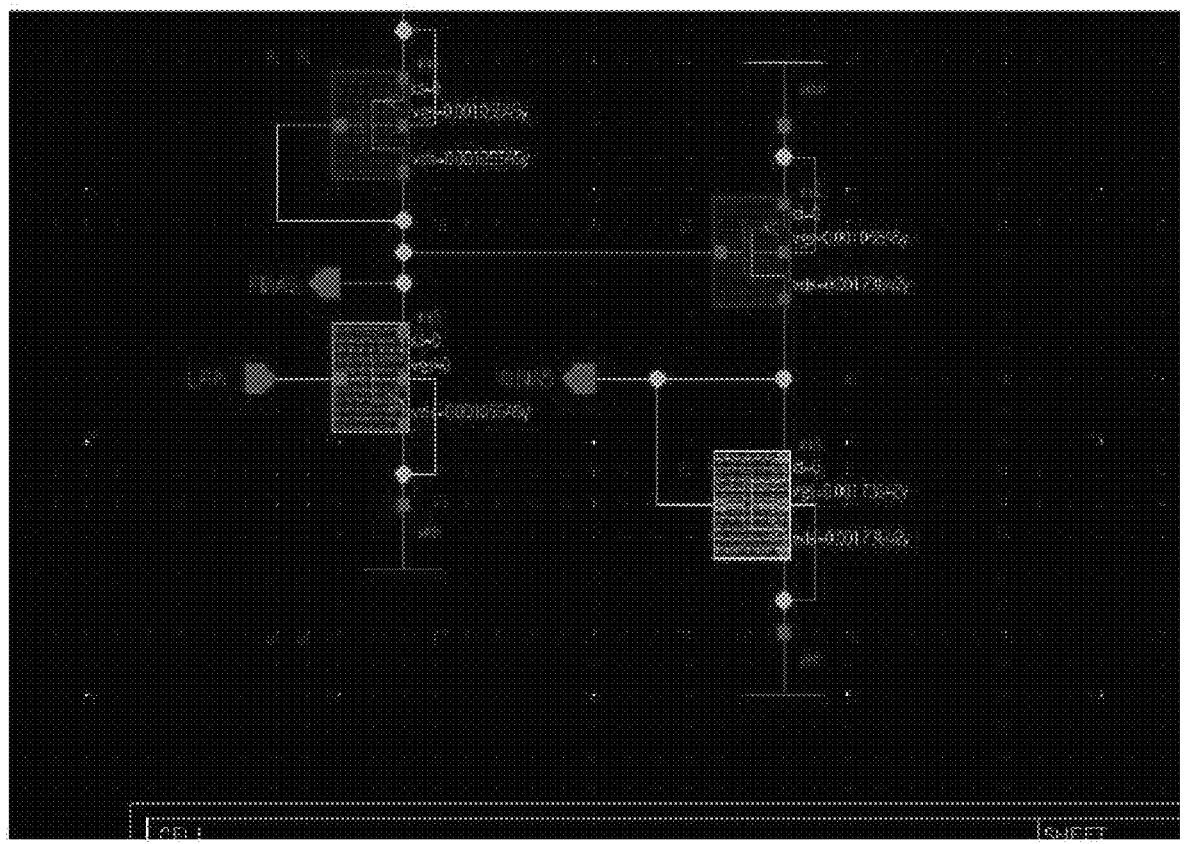

FIG. 22 signifies the use of color-coded rectangles overlaid on top of circuit symbol instances.

Figure 23:
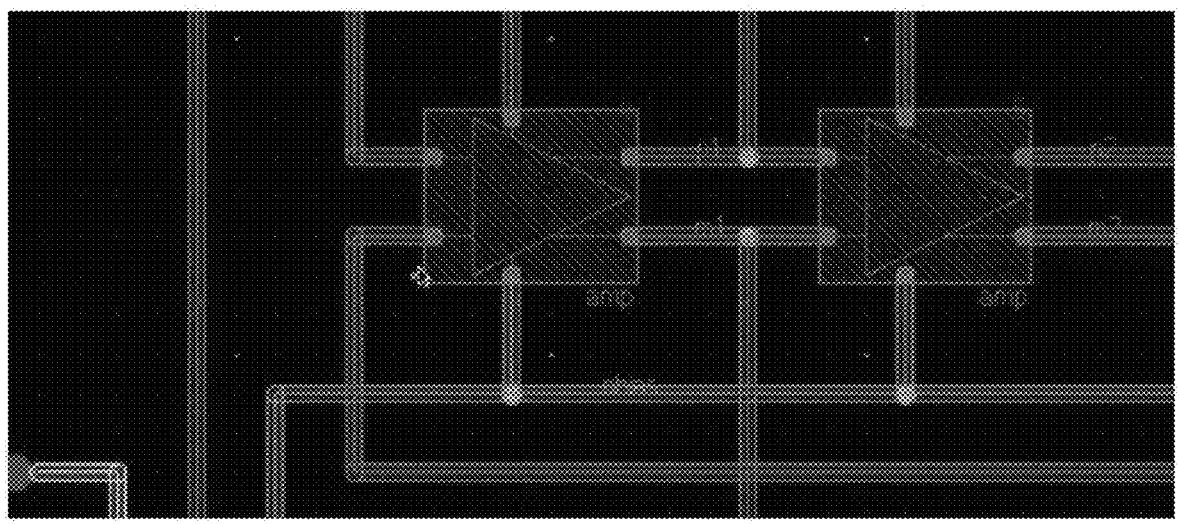

FIG. 23 signifies a low altitude zoom circuit map showing heat mapped nets in a VCO design.

Figure 24:
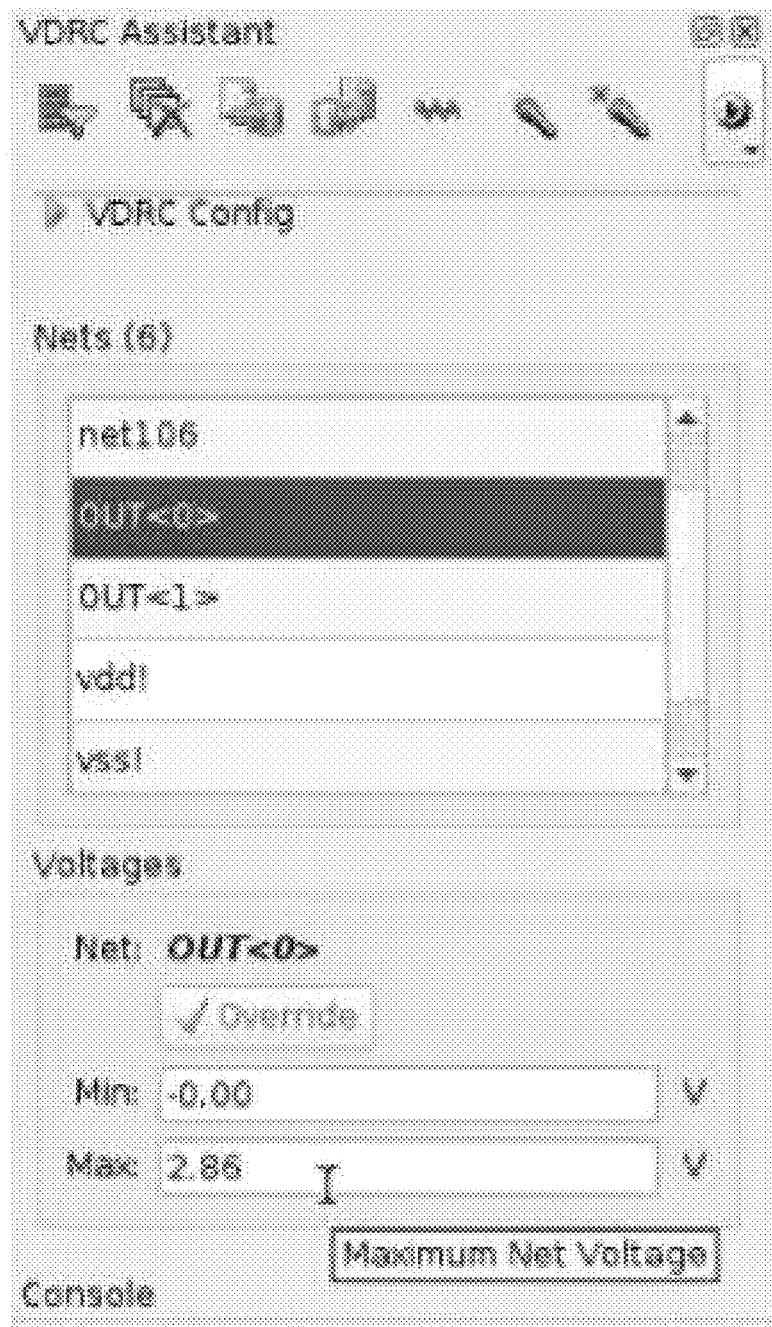

FIG. 24 signifies a dialog box for a Voltage (based) Design Rule Checking (VDRC) assistant.

Figure 25:
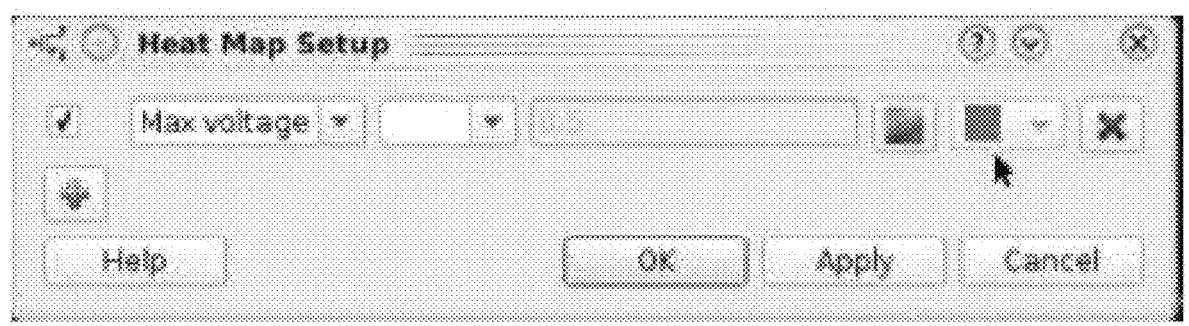

FIG. 25 signifies a dialog box for configuring a heat map setup for a VDRC application.

Figure 26:
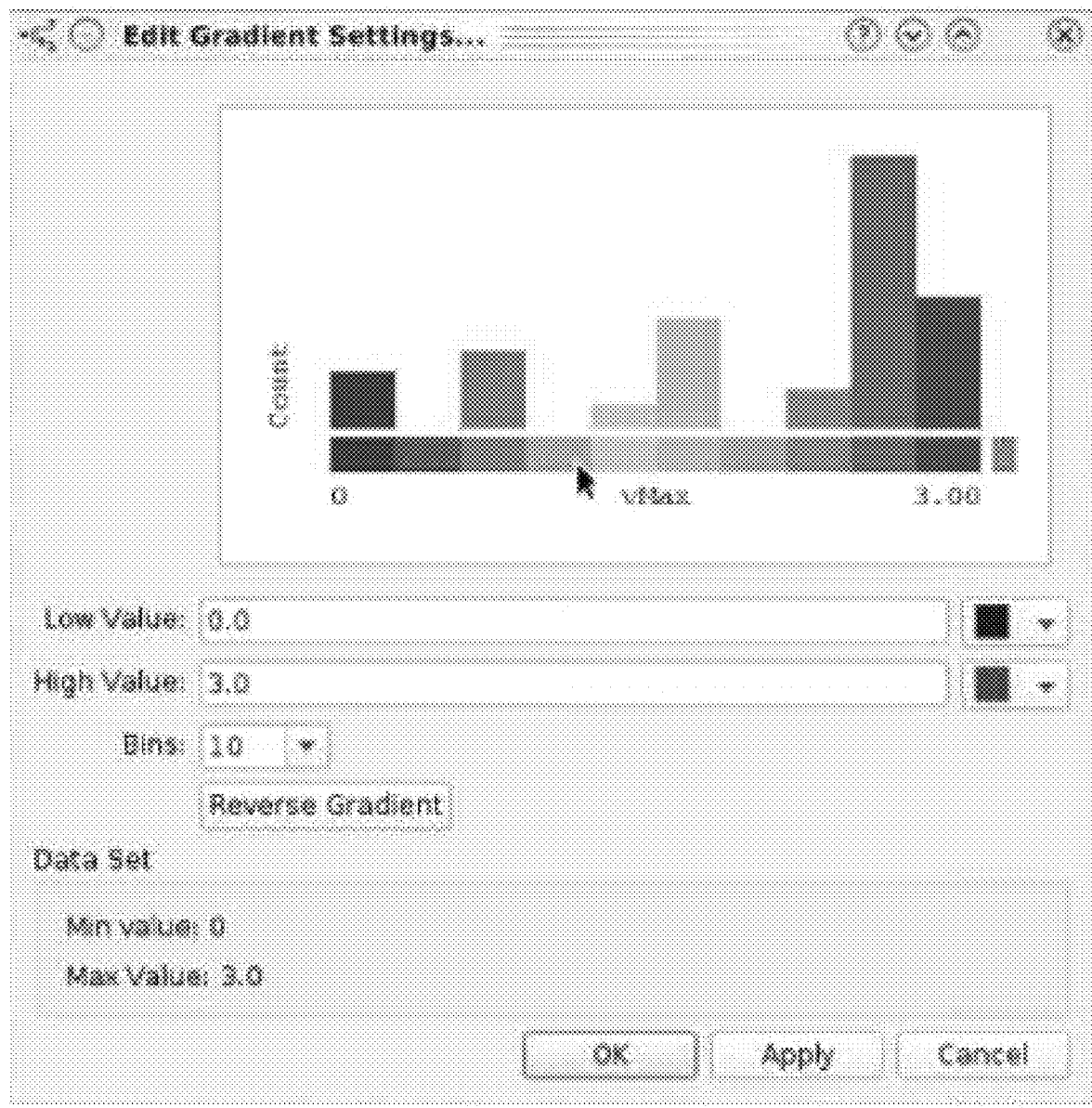

FIG. 26 signifies heat map gradient parameters for a VDRC application.

Figure 27:
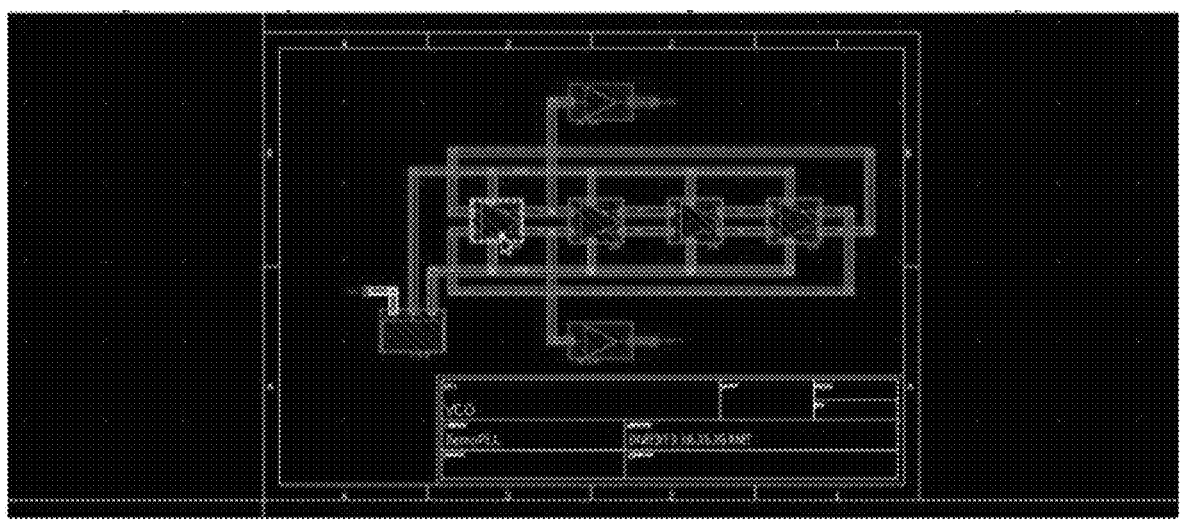

FIG. 27 signifies a heat map for a VDRC application.

Figure 28:

FIG. 28 signifies heat map voltages at a high altitude zoom level.

Figure 29:
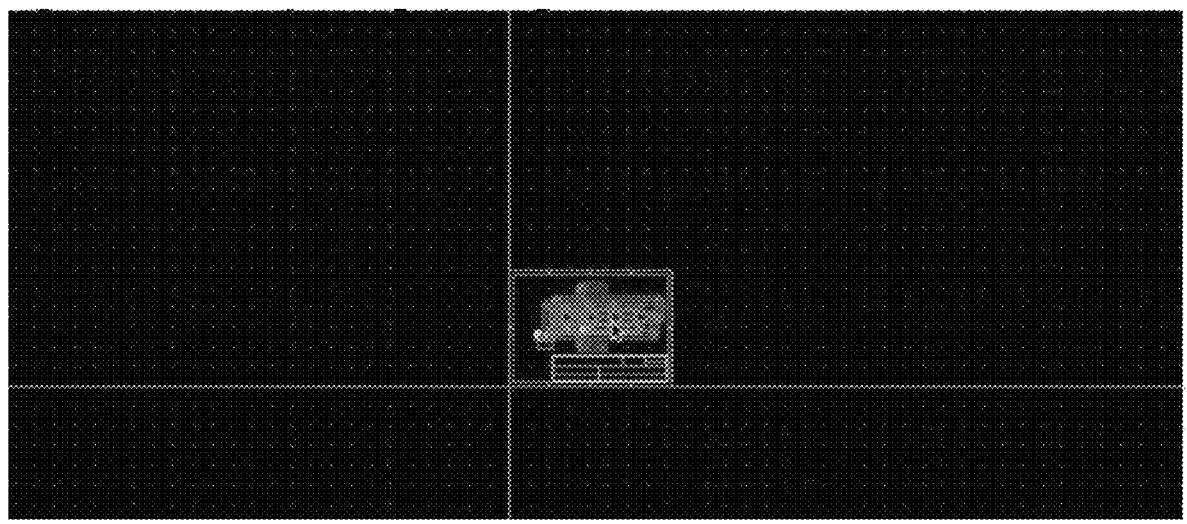

FIG. 29 signifies heat map voltages at a very high level altitude zoom level.

Figure 30:
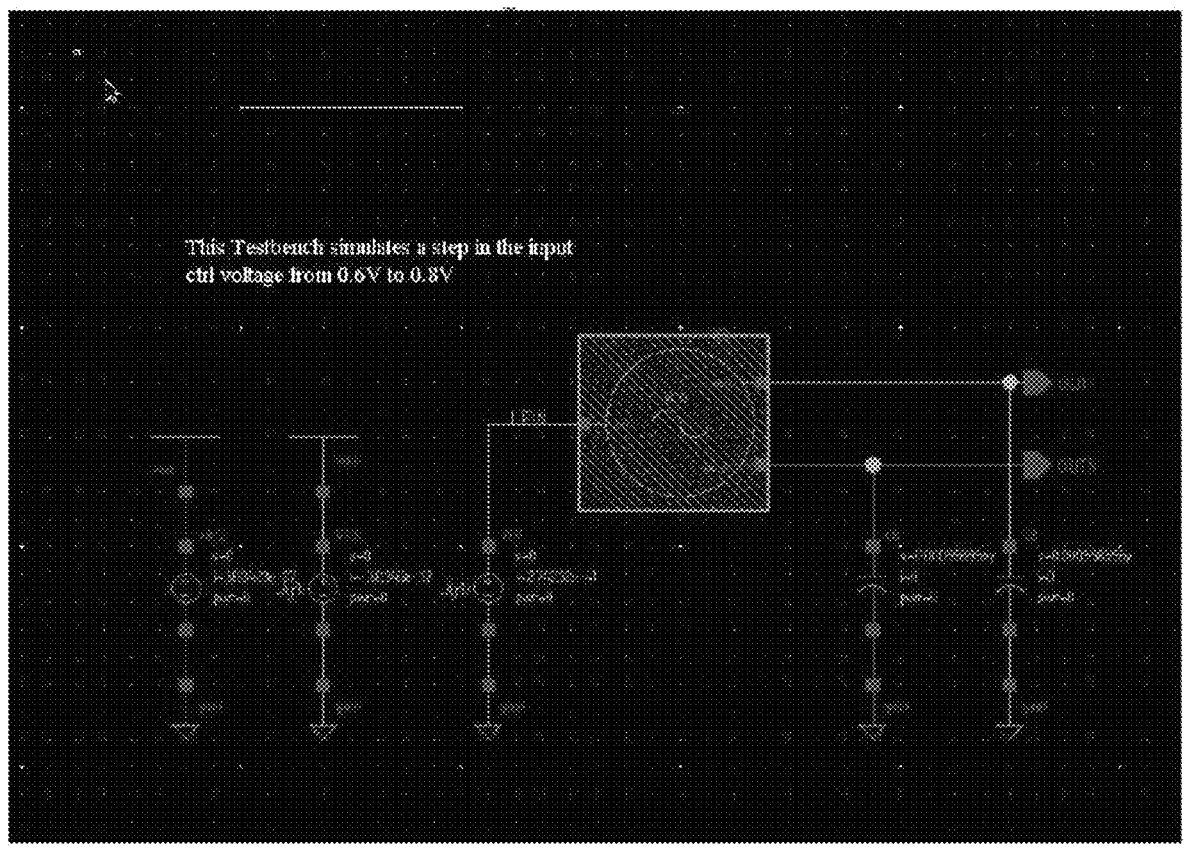

FIG. 30 signifies a VCO Testbench, with orange stipple overlaid on a VCO symbol instance.

Figure 31:
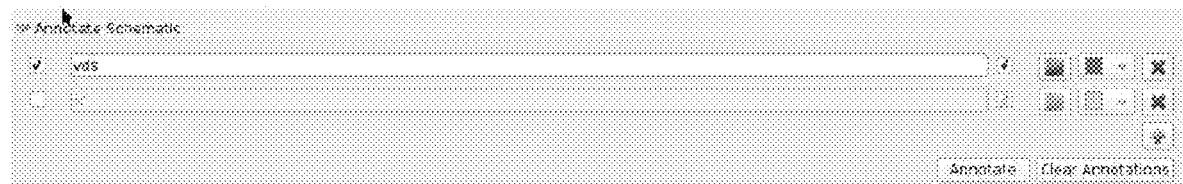

FIG. 31 signifies heat map parameters for 'vds' in a hierarchical schematic.

Figure 32:
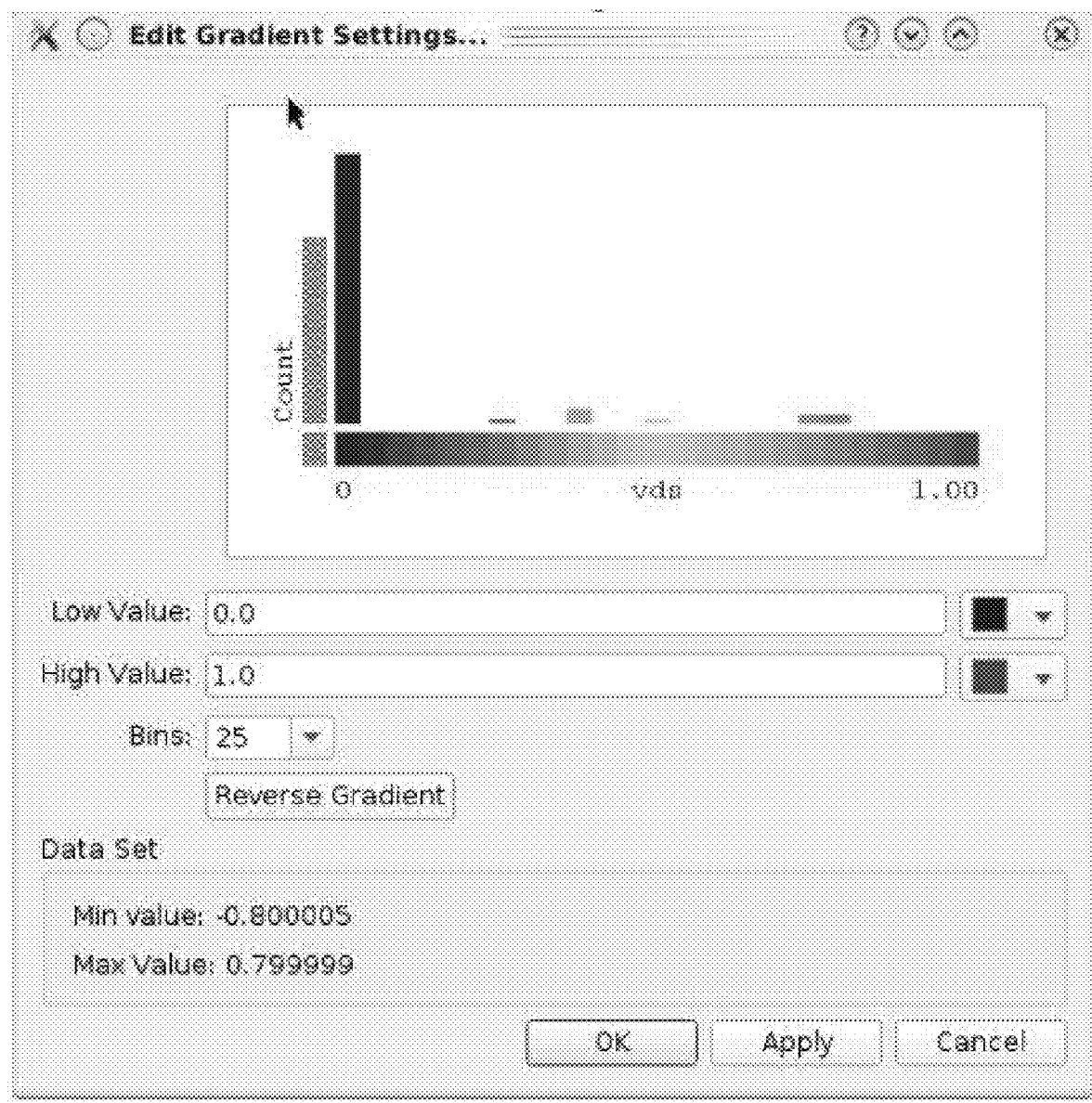

FIG. 32 signifies gradient setup parameters for 'vds'.

Figure 33:
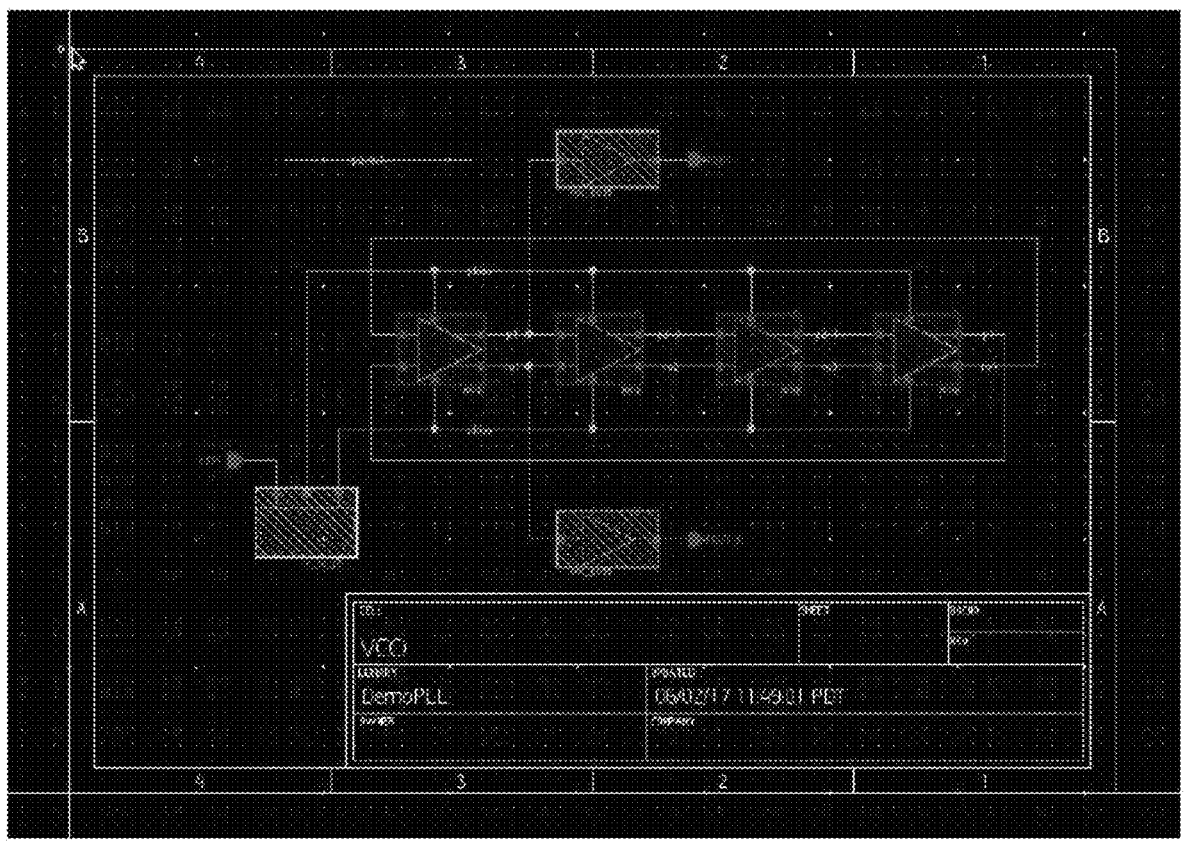

FIG. 33 depicts a VCO schematic, shown an instance-specific map overlay.

Figure 34:
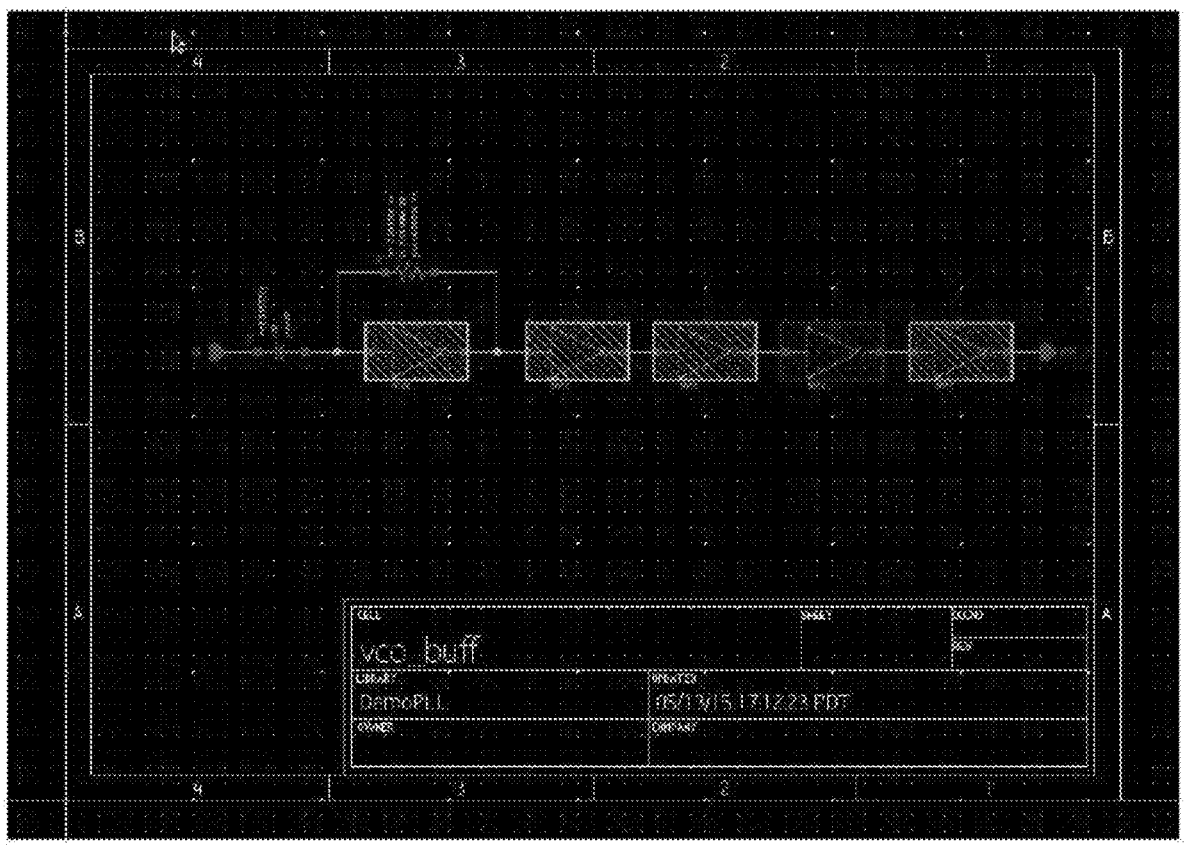

FIG. 34 signifies 'vco_buff' schematic, showing further hierarchy.

Figure 35:
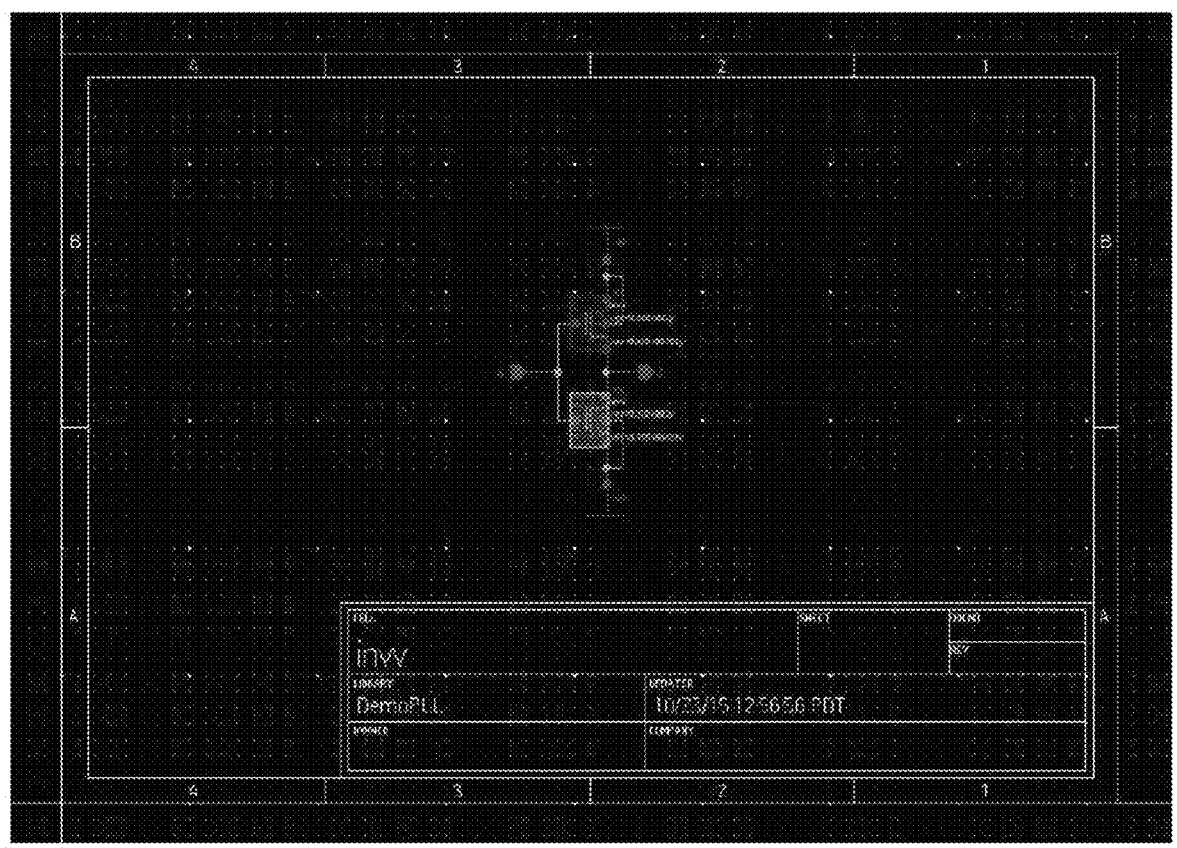

FIG. 35 signifies an 'invv' schematic, at a leaf level of hierarchy.

Figure 36:
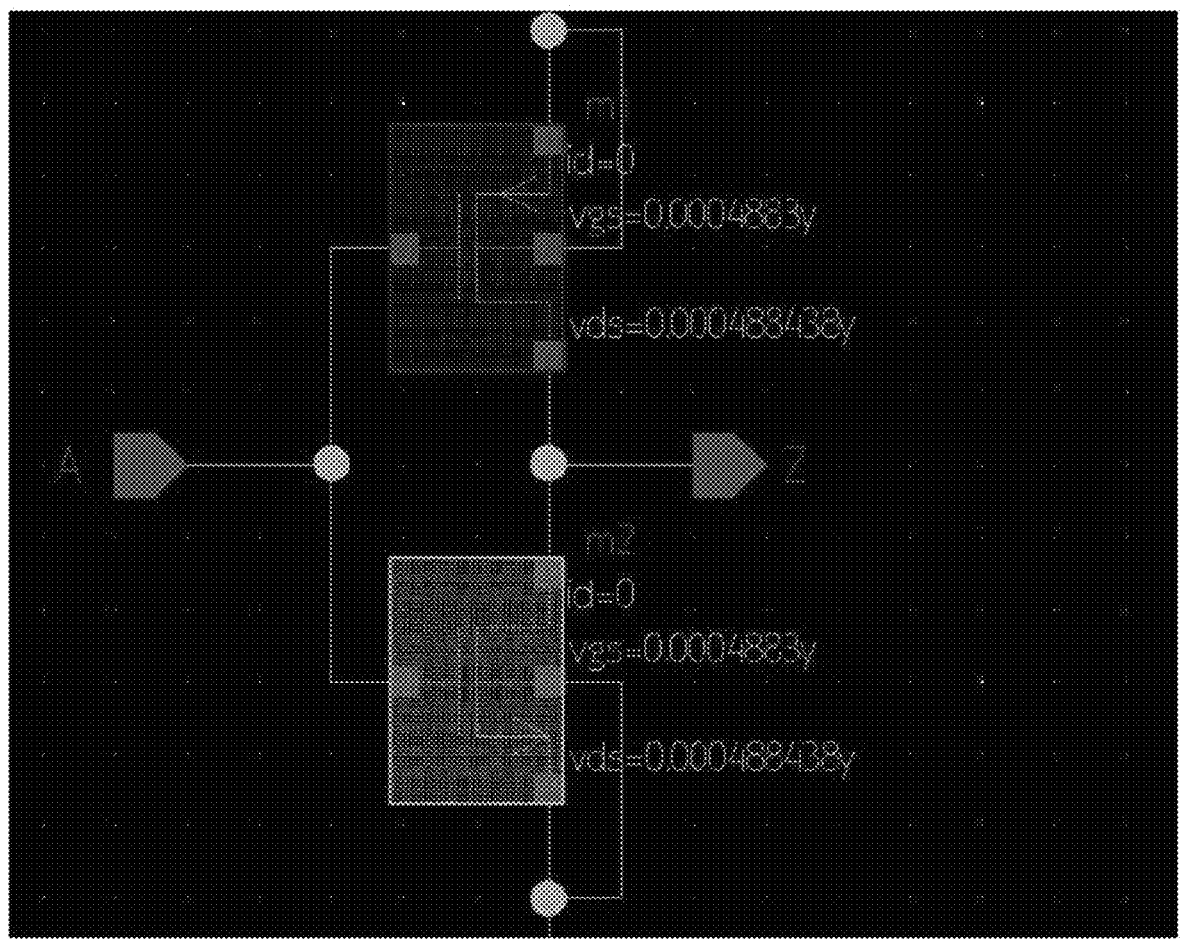

FIG. 36 signifies a detailed stipple pattern on a metal-oxide-semiconductor (MOS) transistor schematic, using leaf-level devices.

Figure 37:
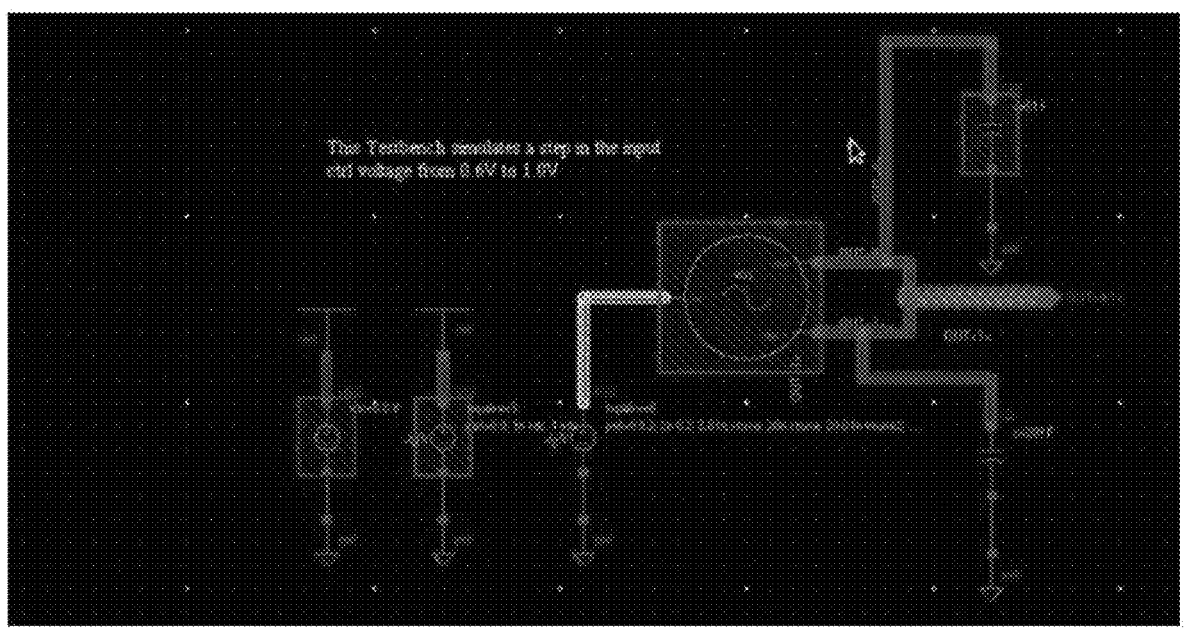

FIG. 37 signifies a Testbench schematic (top hierarchical level), showing VDRC heatmap.

Figure 38:
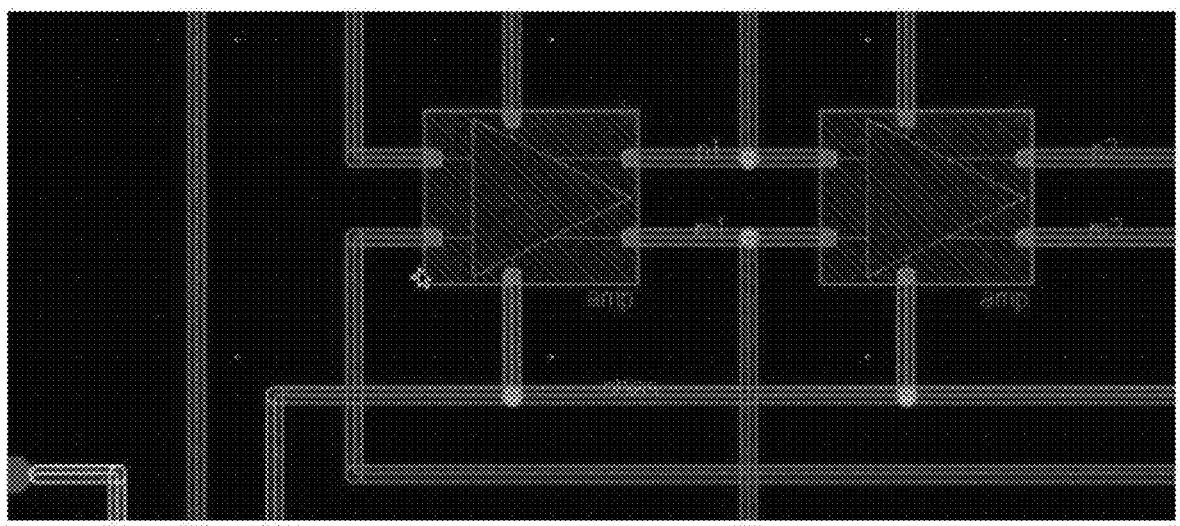

FIG. 38 signifies a VCO schematic (zoomed in) showing a VDRC heat map.

Figure 39:
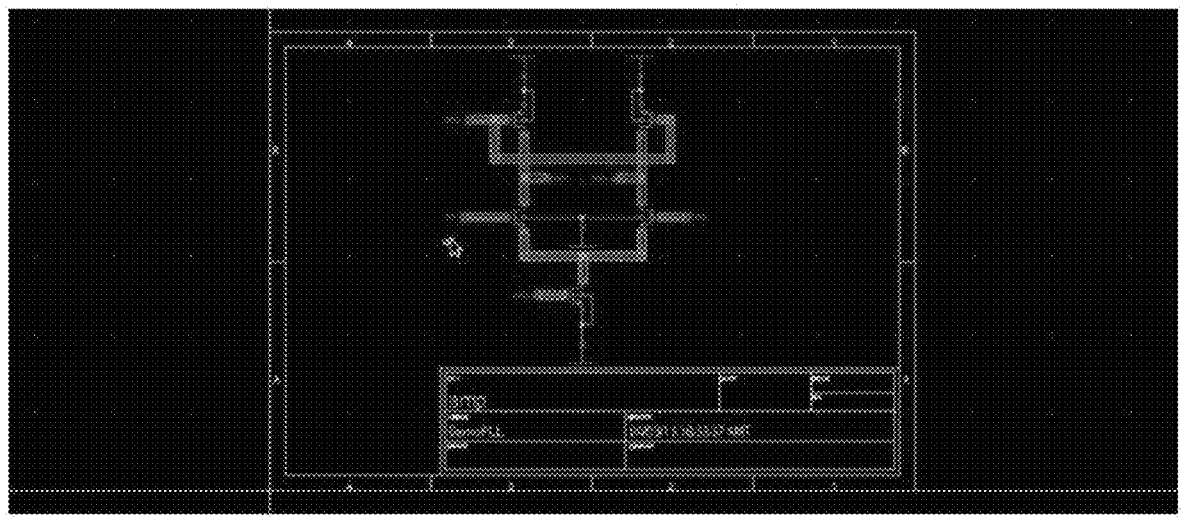

FIG. 39 signifies a leaf level amplifier schematic, showing a heat map with VDRC voltage annotations.

Figure 40A:
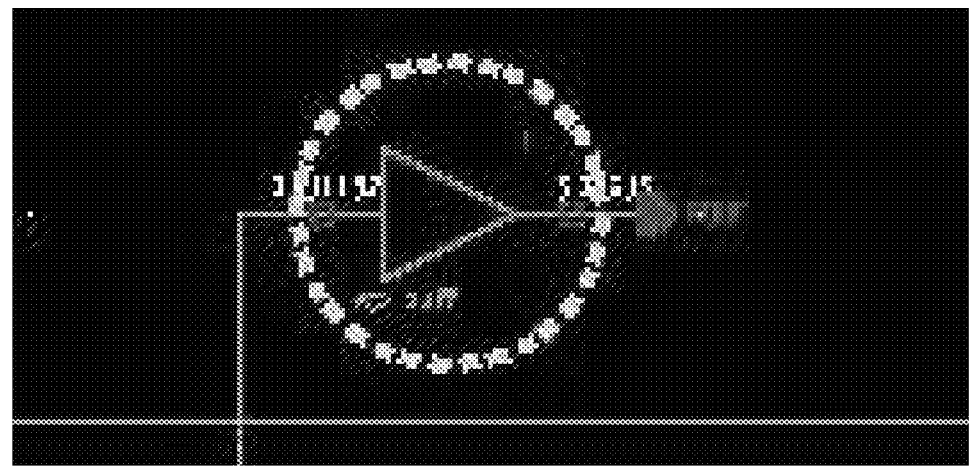
Figure 40B:
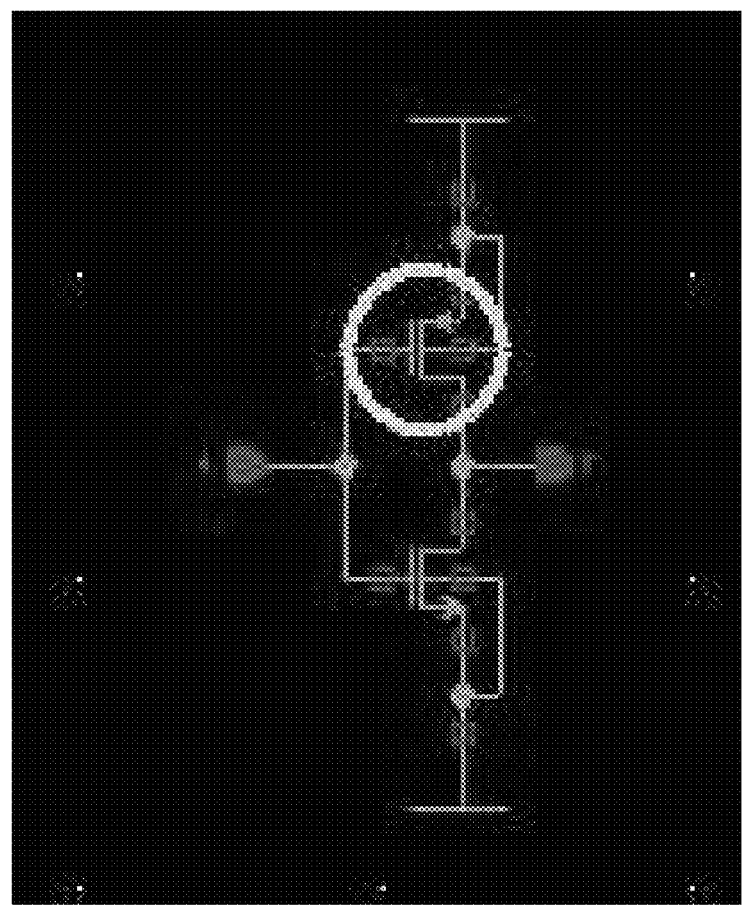

FIGS. 40A-40B signify a high-level schematic showing further hierarchy, and corresponding low level schematics of the further hierarchy.

Figure 41A:
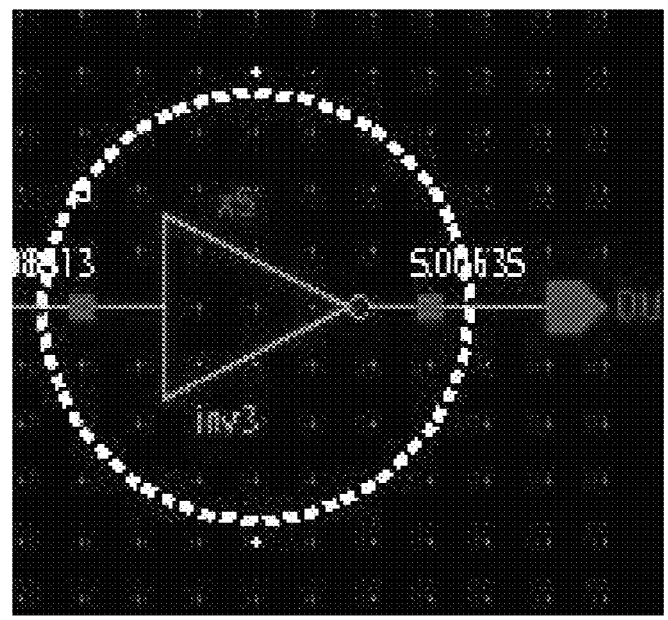
Figure 41B:
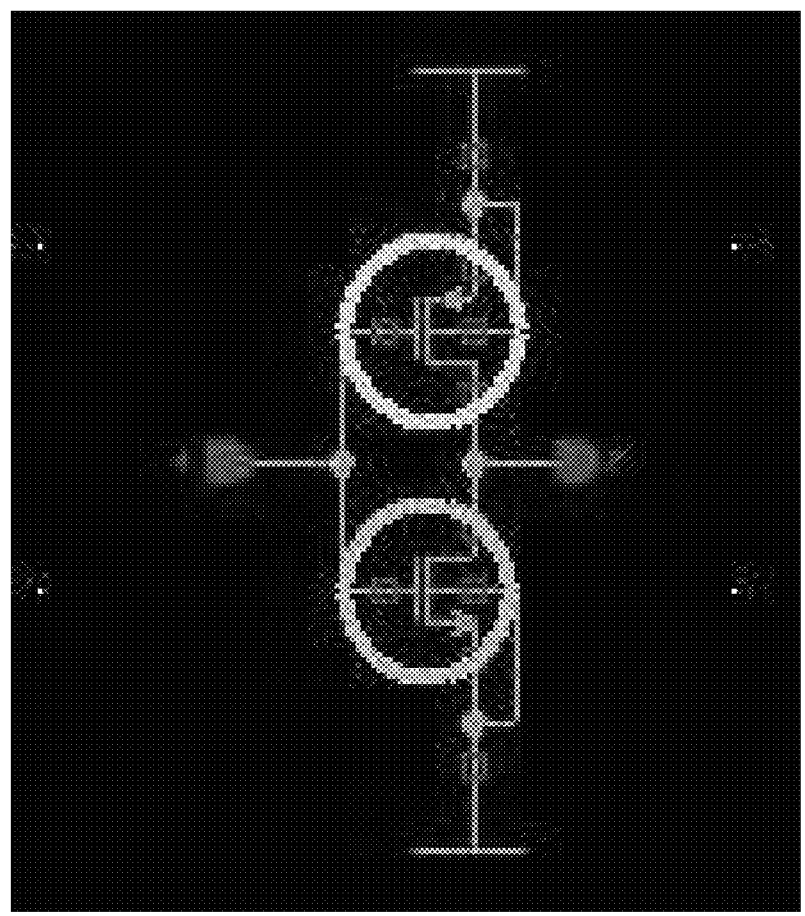

FIGS. 41A-41B signify a high-level schematic showing further hierarchy, and corresponding low level schematics of the further hierarchy.

Figure 42:
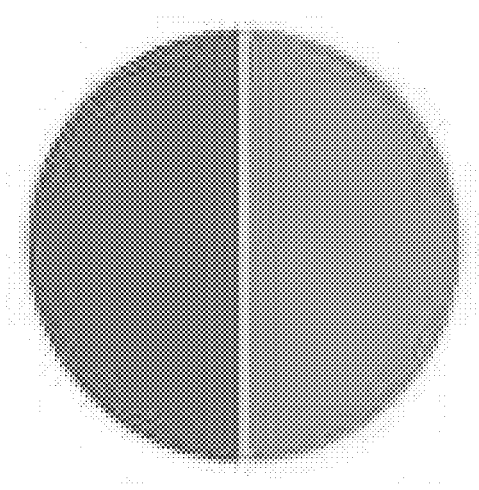

FIG. 42 signifies a hierarchy symbol indicating a ratio of lower-level components having respective color annotations.

Figure 43:
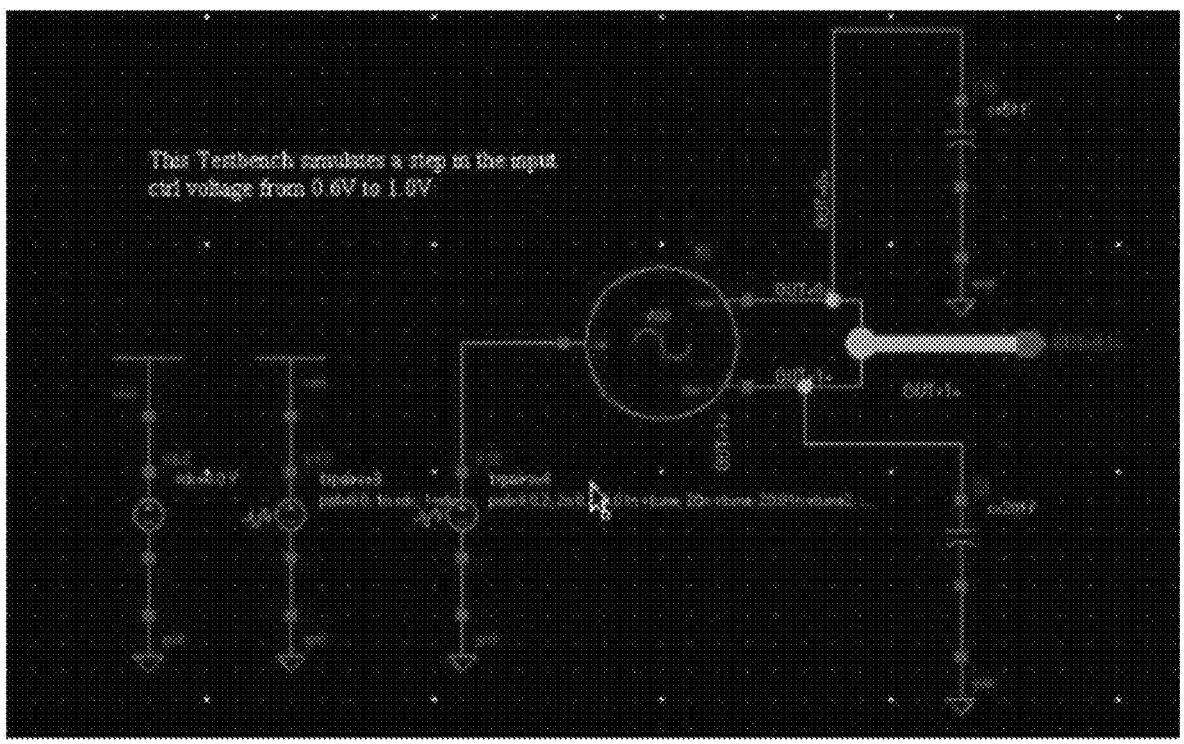

FIG. 43 signifies a VCO Testbench schematic showing Scalar (thin) and Vector (thick) nets.

Figure 44:
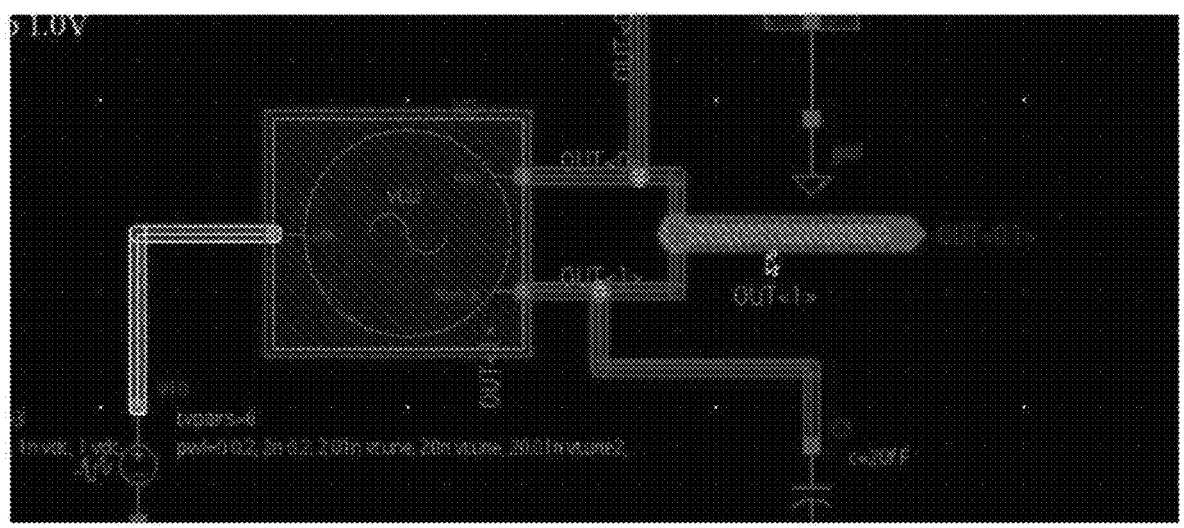

FIG. 44 signifies a VDRC heat map showing details for a vector net.

Figure 45:
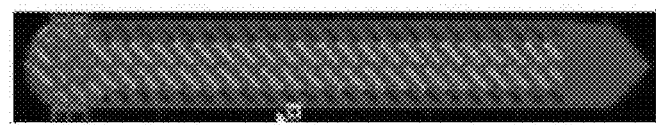

FIG. 45 signifies a graphic for a vector (bus) net stipple.

Figure 46:
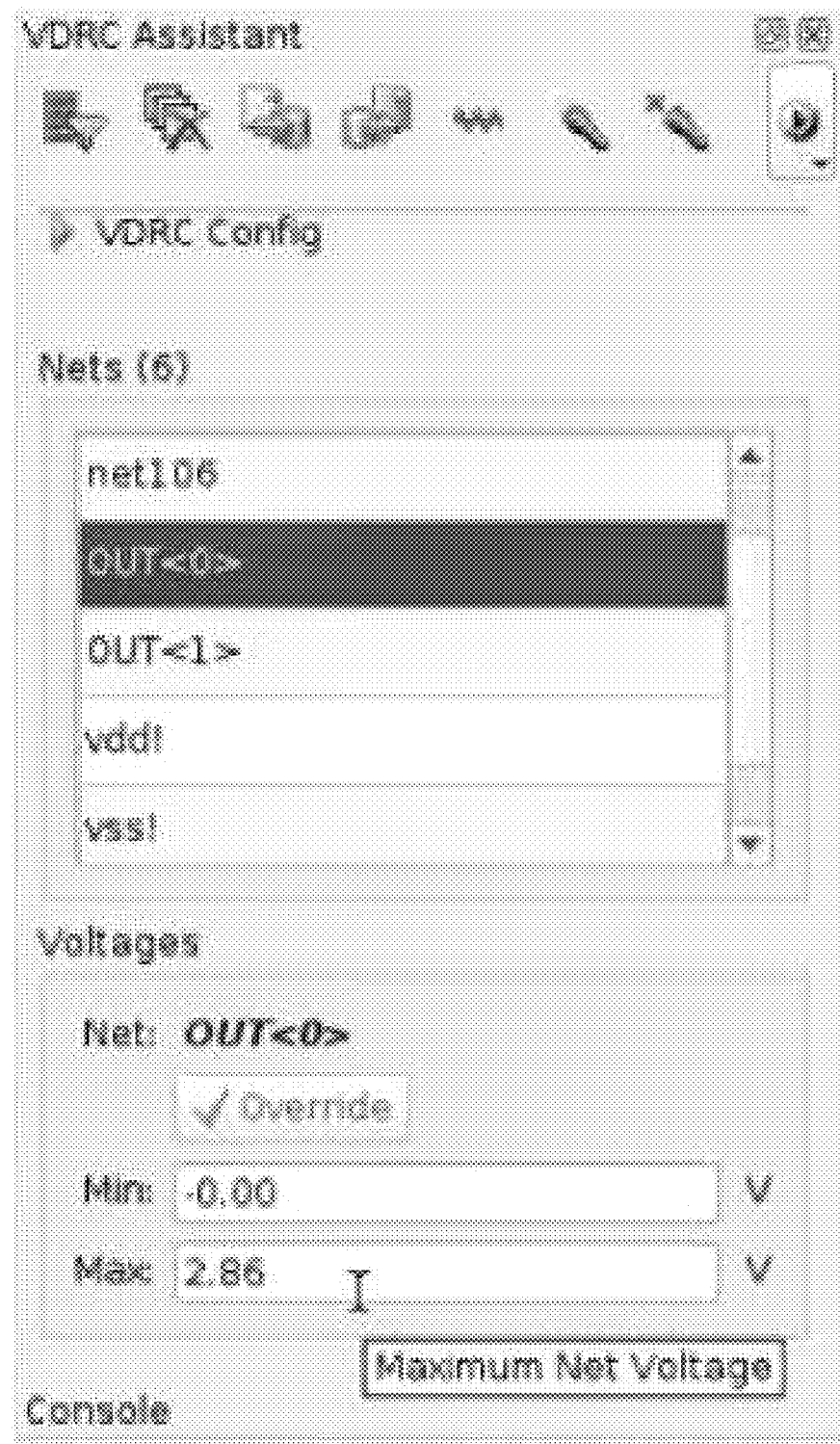

FIG. 46 signifies a dialog box for a VDRC Assistant showing one bus bit.

FIG. 47 signifies usage of a heat map API for gradient and discrete value expressions.

Figure 48:
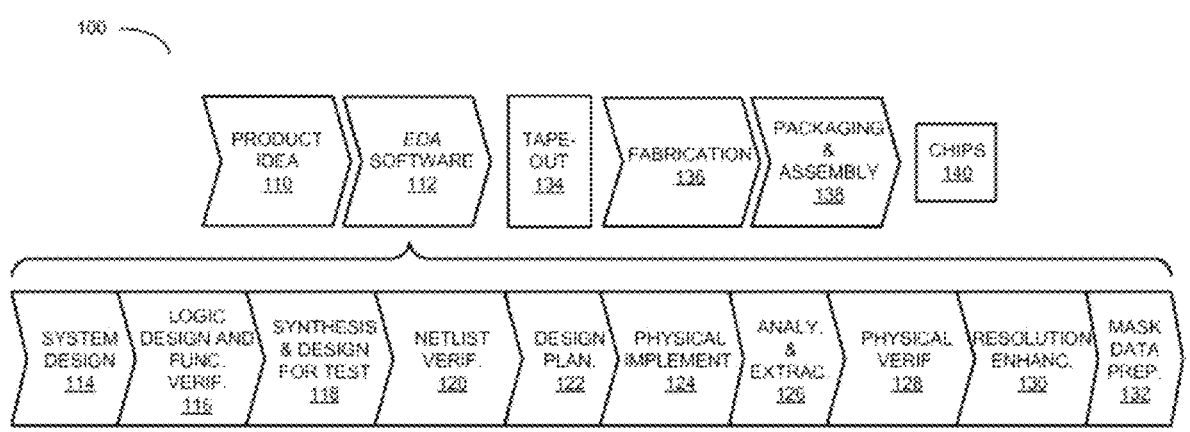

FIG. 48 is a flowchart illustrating various operations in the design and fabrication of an integrated circuit in accordance with an embodiment of the present disclosure.

Figure 49A:
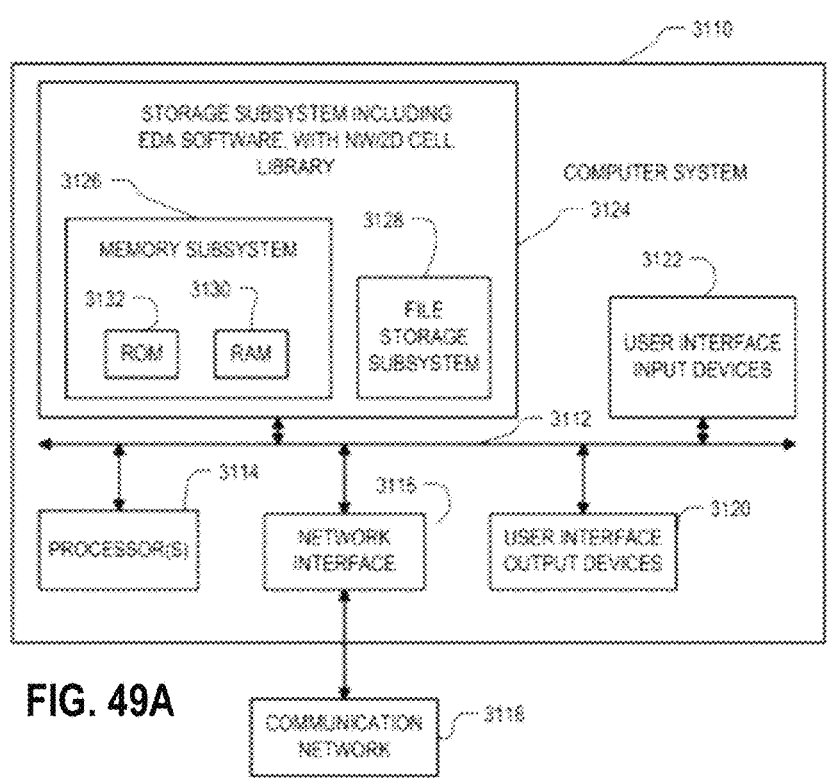
Figure 49B:
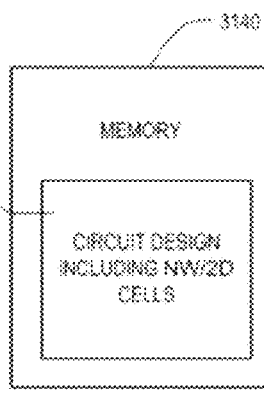
Figure 49C:
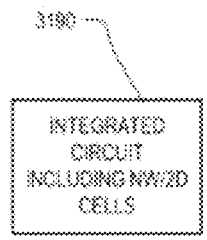

FIGS. 49A-49C are e simplified block diagrams of a computer system suitable for use with embodiments of the technology, as well as circuit design and circuit embodiments of the technology. In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. The following description is instead focused on the distinctive features or elements of various exemplary innovations, embodiments and/or examples. Furthermore, while this description may refer to some components of the structure in the singular tense, more than one component may be depicted throughout the Figures and like components are labeled with like numerals.

The standard mechanism for 'back annotating' data onto design schematics etc. in full custom design tools is via the use of interpreted 'placeholder' labels. When rendering a design schematic and 'annotating' values, the placeholder label text is substituted with the values of interest. For example, different schematic symbols typically have various placeholder labels associated with them, the values for which can be substituted on a per-occurrence basis when rendering the design.

FIG. 1 signifies an example symbol view for a 4 terminal NMOS Transistor.

Various text labels are displayed, four of which are associated with transistor terminals (of the form cdsTerm("D"), cdsTerm("G"), etc.), and 5 which are associated with various parameter values of the form cdsParam(1), cdsParam(2), etc. There is also a single cdsName( ) label. Each of these labels has a default position and color.

By default, the cdsParam( ) labels are used to show some of the main parameters or properties of each transistor in a schematic design, as shown in FIG. 2. Here, no specific annotation is being performed, and the tool uses three of the cdsParam( ) placeholder labels to show values for the transistor model 'pch_svt_mac', and the transistor 'W' and 'I' geometry parameters which have numerical values. We can also see the cdsName( ) label (in red) used to show the transistor names e.g. m3, m4, m5.

FIG. 3 on the other hand signifies the same schematic, this time with the DC operating point being back annotated. Here, the cdsName( ) label retains its use to display the transistor names, but the cdsParam( ) labels are now used to display the drain current 'id', the gate-source voltage 'vgs', and the drain-source voltag 'vds'.

The back annotation via labels approach works relatively well for very small designs (even if all the parameters cannot be seen at the same time), but has numerous disadvantages particularly for large designs. By way of example, if the small design of FIG. 3 (which is shown zoomed in) is 'fit' into the available canvas space, it immediately becomes very difficult to read the labels, as seen in FIG. 4.

In larger designs, it will be typical for the circuit designer to zoom out even further to see the full connectivity in a single canvas page. At this point, the software doesn't even attempt to display the labels, as signified in FIG. 5.

The results are such that to see the full design, the circuit designer cannot read any labels. To read the labels, the circuit designer must zoom in to a magnification level where they become visible, at which point the circuit designer usually can no longer see the full design. The designer must now resort to multiple zoom and/or pan operations to see the design labels in the context of the design itself. Further, the designer has little idea which devices are the most "interesting" i.e. have the most extreme values (largest or smallest) for the various properties being back annotated. The designer must inspect each device and then remember the corresponding values and locations, or else look in a tabular (non-canvas) report (such as that shown in FIG. 7), to see all the values at once, and perform various sorting, filtering and 'slice & dice' operations.

An example of a large dense design with no labels displayed, is signified in FIG. 6.

Further, if the design contains any hierarchy (most do these days), then with the interpreted labels scheme of the prior art, the circuit designer can only see the values for the current hierarchical level displayed within the schematic canvas. The designer now must navigate around the design (descend, ascend operations in the canvas) hierarchy to see the values being annotated at each level, and still has little sense as to where the outlier or "interesting" values are, and again must consult a tabular report.

Full custom circuit designers prefer to interact mainly with the schematic canvas, and seek graphical means to see the most extreme values for values being back annotated. There is a need for a graphical solution that allows the designers to easily get a sense of the data (magnitude values), and view where the outliers are, and where in the design hierarchy they exist, and to be able to do so without excessive zoom/pan/navigation operations being required. There is a need for a solution that presents the user with the 'bigger' picture, so that they can get a sense of the magnitude of the data values being displayed while zoomed out to a high altitude, i.e. a need for a high-altitude solution that helps the user quickly understand where to zoom and/or navigate to see the detail.

Embodiments In some of the embodiments disclosed herein, the following techniques are provided:
- Gradient Based Data Value Binning and Color Mapping
- Range-based Filtering During Color Mapping
- Boolean Expression-based Color Assignment using a Rich Expression Language, allowing for EDA design objects that match very specific conditions to be easily identified.
- Use of Relational Database Technology to perform Fast Queries
- Dynamic Redraw of Color Map Objects for High Altitude Zoom levels to avoid information loss
- Ordering of color packets used in drawing so that 'worst case' design objects or objects 'in need of attention' are readily identified, even at high altitude zoom levels
- Dealing with Multiple Data Values at the same time via an Aggregation Method
- Dealing with Instance Objects in EDA Designs
- Dealing with Net Objects in EDA Designs
- Dealing with Hierarchical Designs
- Propagation of 'worst case' Instance or Net object colors 'up' a design hierarchy
- Dealing with Vectorized Instance and Net objects in a design.

Concepts of Certain Embodiments Disclosed Herein
- Range-based Filtering During Color Mapping
- Use of Relational Database Technology to perform Fast Queries
- Dynamic Redraw of Color Map Objects with zoom-level-related oversizing to avoid information loss
- Ordering of color packets used in drawing so that 'worst case' design objects or objects 'in need of attention' are readily identified, even at high altitude zoom levels
- Dealing with Multiple Data Values at the same time via an Aggregation Method
- Dealing with Instance Objects in EDA Designs via instance-based overlays
- Dealing with Net Objects in EDA Designs via net-based overlays
- Dealing with Hierarchical Designs via hierarchical propagation of 'worst case' colors
- Dealing with Vectorized Instance and Net objects in a design.

Enablement of Some of the Embodiments Disclosed Herein

In some of the embodiments disclosed herein, traditional heat map techniques are made more efficient and useful to work well in the context of large EDA designs which may be hierarchical designs and/or contain vectorized instances or nets. The embodiments further leverage relational database technologies to perform fast queries and identify/color-code objects matching specific conditions. As discussed herein, these objects (which may in certain instances be logical objects), for which heat-mapped color coding may be applied, may comprise devices, components, conductive interconnections between multiple devices and/or components, nets, modules, and/or other portions of an IC design as discussed herein. Unlike traditional heat maps, some of the embodiments disclosed herein include an aggregation method that allows for multiple quantities to be considered at the same time, and allows extreme-value bearing objects to be readily identified, even in large and/or hierarchical designs. In some of the embodiments disclosed herein, the heatmap can be drawn differently at different zoom altitudes, ensuring objects of interest are still readily identifiable even at extremely high zoom altitudes. Filter limits allow for certain data values to be excluded from heatmap consideration, again making it easier for a user to identify 'interesting' EDA design objects in large designs.

EDA Heat Maps

In general, a heat map (or heatmap) is a graphical representation of data where the individual values contained in a matrix are represented as colors. Weather Information is often signified using heatmaps, as in the example of FIG. 8. The color encoded information is typically displayed atop an image of the raw data-bearing objects themselves (in the case of weather information, the underlying display is typically a map, such as the map of the North American region of FIG. 8).

Gradient Based Heat Map

A gradient based heat map in a circuit schematic is used by way of an example. A portion of a design hierarchy is displayed initially, in which no heat map is employed, and in which only labels are shown as per the prior art. This is signified in FIG. 9.

FIG. 10 signifies a heat map setup in which the MOS transistor 'vds' parameter is selected for annotation (near the top of the dialog, in red highlighted area).

When the 'Annotate' button is pressed (bottom right corner of red highlighted area), the design schematic is overlaid with color encoded stipple patterns as shown in FIG. 11. In an embodiment, the stippled rectangles are overlaid on top of the MOS transistor devices, with a color scheme that is indicative of the 'vds' parameter values. Note that different transistors have different colors, with m1 and m2 having a similar color (dark blue), and m3 (light blue) and m4 (light green) having different colors corresponding to different 'vds' values. In an alternate embodiment, the stipple pattern rectangles may be presented as an 'underlay' rather than an 'overlay'. In another embodiment, alpha blending may be used in lieu of stippling to achieve transparency.

A gradient editor dialog allows the circuit designer to change the color scheme, and inspect the ranges, in addition to setting upper and lower limits of interest. When the (green circled) heat map icon to the right of the line containing the 'vds' parameter in FIG. 10 is pressed, the 'Edit Gradient Settings . . . " dialog appears as in FIG. 12.

This dialog enables the circuit designer to enter a low value and a high value, which are taken as lower and upper limits respectively. By default, the entire data set is inspected for the most extreme values, which are then used as the initial low/high filter limit values respectively. However, the designer can edit these low/high values, increasing or decreasing them as appropriate. With the filtering scheme, data values that fall outside these filter low/high limit ranges are not heat mapped i.e. will be rendered without any overlaid color stippling. In addition to specifying the filter limits, the designer can also choose colors to represent these limits, using the color dropdown menus (circled in green) of FIG. 12. Data values that fall in between the limits are then automatically mapped onto the appropriate colors. A data binning scheme and a discrete number of colors are available for color-coding. Certain embodiments enable a designer to edit the number of color bins (here we show a selection of 25 bins, which is sufficient for many applications), and/or to reverse the color scheme (e.g., such that 'blue' colors represent 'high' values of the quantity, rather than low values, as in FIG. 13A). This enables the designer to set 'blue' as 'good' and 'red' as 'bad' or 'in need of attention' for any quantify of interest, which is convenient for quickly getting the big picture, particularly when multiple quantities are displayed at once as will be explained further below. The Data Set field toward the bottom of the gradient editor dialog shows the observed minimum and maximum values for the quantity of interest (in this case, the 'vds' parameter for MOS devices).

Near the top of the dialog is a color histogram, signifying how many data points fall into each color bin. In this example, there are a larger number of devices with the blue color, having 'vds' parameter values close to zero, and a smaller number of devices in the range 0.3 (light blue) to say 0.7 (dark orange). The devices represented within the grey bar at the far end of the histogram represent devices that are not color coded, because these devices are outside of the defined value range for the histogram. When hovering the mouse pointer over a color bin, a tooltip appears to list the bin range values (min, max), and the number of data points (count) represented by this bin.

FIGS. 13B-13D illustrate example graphical histogram depictions of data shown on a colored scale, and indicating how the scaling of various portions of the graphical depictions may be automatically modified based on a designer's selected scaling options (as shown in FIG. 13D). As shown therein, an entire data set is shown in the histogram depiction of FIG. 13B. As shown, there is a relatively large amount of data represented between x-axis values of 0.135f and 3.58f (as shown by the tooltip display shown in FIG. 13C), while a much smaller amount of data is represented at values higher than this large dataset. These smaller regions of data may represent outlier data generated during a design process. A designer may elect to focus only on the outlier data by changing the lower bound of the x-axis to omit the large collection of data in the dataset, as shown at FIG. 13D. The graphical display may then automatically adjust, generating a grey bar at a left end of the generated display representing the amount of data below the defined lower bound of the x-axis. Similarly, a grey bar at a right end of the generated display may represent the amount of data above a defined upper found of the x-axis, if the designer chooses to define an upper bound for the x-axis and thereby omit data as being above the generated upper bound. Moreover, the size of the y-axis may automatically adjust based on the highest remaining collection of data, and the grey bar, representing data below the lower bound, may be modified with an arrow (or other indication) to indicate that the amount of data points located below the lower bound exceeds the automatically-selected y-axis maximum as shown in FIG. 13D. Moreover, the coloring of the scale (across the x-axis) automatically adjusts to fill the entirety of the bounded x-axis.

With this data, we can again consider the image shown in FIG. 11, and it now becomes clear that 3 of the 4 MOS transistors have relatively low 'vds' values, with one (the one in the lower right, light green color) having an intermediate value of 'vds' closer to 0.5.

Discrete Expression Color Map

In the previous section, the values of a continuously varying quantity ('vds' parameter for MOS devices) was mapped onto color bins using a gradient editor. In another embodiment, Boolean expressions can be entered and associated with discrete colors, as shown in the setup of FIG. 14. Here, highlighted in red the image, the circuit designer has entered an expression 'id>0', and is in the process of associating that expression with a green color using the color dropdown (highlighted in light blue). The 'vds' parameter previously considered is unselected in the top row of the setup window in this case. Now, when the 'Annotate' button is pressed, only those MOS transistors for which the drain current expression 'id>0' evaluates to true will be rendered with an overlaid stippling. Any MOS transistors for which the drain current 'id' quantity is zero or negative (for which the expression evaluates to false) will simply not be rendered with a colored overlay.

The results of applying the heat map setup of FIG. 14 are shown in the schematic window of FIG. 15. In this case, only the top two transistors of this portion of the schematic are color coded, since the expression evaluates to false for the other 3 transistors.

Relational Database Technology

In another embodiment, the instances, nets and their corresponding raw data values are stored within tables in a relational database. This enables the heatmap engine to perform extremely fast queries of objects which match certain conditions (e.g. which objects fall within a certain color bin, or for which certain Boolean expressions evaluate to true). It also enables the fast determination of the overall values used to display the min/max values and to pre-seed the filter limits in the setup dialog of FIG. 12.

Relational database expression languages are rich and combine a variety of mathematical and other functions, with logical operators such as AND, OR, and with relational operations such as >, >=, <, <=, ==, !=. Multiple quantities can be referenced within an expression e.g. 'vds>0.5 AND sqrt(vgs)<0.2'. These languages allow for quite complex expressions to be entered, allowing a circuit designer to 'mine' a circuit design for devices that match very specific conditions of interest.

In another embodiment, the relational database is the SQLite3 database, and the expression language is correspondingly the SQLite3 expression language, which is represented in FIG. 16. It will be understood that other relational databases and expression languages can be employed with departing from the spirit of the art. It will also be understood by those skilled in the art that other data structures and data query capabilities (i.e. not relational databases) can be used, and that other expression languages (not relational-database languages) can also be used, again without departing from the spirit of the art.

High Altitude Rendering

Consider again FIG. 17, in which a 'medium altitude' zoom level is used. When 'zooming out' to higher altitudes, the heat map is dynamically reconstructed, to ensure that the overlaid patterns are still clearly visible. This is quite unlike traditional heatmap applications, which are usually overlaid on static pictures, and is necessitated for the embodiment disclosed herein by the very large designs that are often incorporated in EDA tools. The results of a sequence of zoom operations for a large design are shown FIG. 17 through FIG. 19.

When looking at the extremely high altitude zoom level of FIG. 19, the highlighted areas appear 'oversized' relative to the much smaller transistors that are drawn below them. The size of these highlighted areas may be specified by a minimum size (e.g., a minimum number of pixels). In other embodiments, the size of these highlighted areas may be specified via other mechanisms (e.g., algorithms selecting a relative size of the highlighted area), and/or the like. The area within the design sheet boundary rectangle FIG. 19 is not just a scaled down version of the image in FIG. 17, as such a simple image-based scaling would lose information. The circuit designer would quickly see the heat map overlaid stipple patterns reducing to just a single pixel (or disappearing entirely) depending on how high the zoom level is, making them essentially impossible to see.

Instead, the heat map information is dynamically redrawn differently at different zoom levels, oversizing the stipple patterns as necessary (relative to their underlying objects) to make sure that the overlaid colors remain visible. In addition, the color packet drawing is ordered such that the most extreme (aka 'worst case') color stipples (typically the red values) are drawn last (on top), so that they stand out the most for circuit designer attention, and aren't 'buried' under the highlights for other objects with 'less interesting' values. In another embodiment, alpha blending using different transparency levels could be used instead to similar effect.

Also, as noted previously, the circuit designer can reverse the color order in the Gradient Editor dialog (see FIG. 13A) to define custom 'worst case' or 'most interesting' colors on a per-annotated-item basis, such that for example the low numerical values for one parameter are considered 'interesting' and map onto red colors, while high numerical values for other parameters might be considered interesting and made to map onto red colors, so that red always means 'bad', 'interesting' or in 'need of attention'.

The overall effect is easily seen when looking at heat maps for larger designs that contain many instances, as seen in FIG. 17 through FIG. 19. In all cases (and especially in the case of the very high altitude zoom level of FIG. 19), a 'red' highlighted device is seen in the middle right of the diagram (close to the mouse pointer), indicating a potential item of concern for a circuit designer to review. The high-altitude heat map contains enough information for the designer to know where to zoom for additional detail.

Viewing Multiple Quantities at Once

In another embodiment, the tool allows for an arbitrary number of quantities to be considered simultaneously. The red-circled "+" button in the lower right of FIG. 20 allows additional rows to be added to the annotation setup.

FIG. 20 shows a tool state in which the circuit designer has enabled two quantities ('vds' and 'id') to be displayed at the same time in the same heat map. For objects which have multiple color values are to be represented (no values filtered outside the min/max range values), the 'worst case' color value among the different values is chosen and that is the final color used in the heatmap for this object. In other embodiments, objects having multiple color values assigned based on the inclusion of multiple quantities to be display simultaneously, a separate color (e.g., white) may be utilized to represent those objects having multiple assigned colors. For objects for which only a single value is relevant (e.g. the other values may be outside of the corresponding min/max range values) then that single value's corresponding color is used.

Viewing Both Gradients and Discrete Expression Color Maps Simultaneously

In another embodiment, both gradients and discrete expression color maps can be shown simultaneously. The setup of FIG. 21 is an example of this capability. Here, the first row shows a gradient setup for Ws', while on the second row a dark blue color is assigned to those objects for which the expression 'id>0' evaluates to true. Again, the color packet ordering scheme is used when there are conflicts, in order that the 'worst case' or 'more interesting' color is used as the final color. This draws the circuit designer's attention to objects that need additional investigation.

Instance Based

Many of the images used as example so far have been with respect to device instances within a circuit schematic. When the object under the heat map annotation is an 'instance' object (these are objects that have certain semantics within EDA tool applications), one method is used for rendering the color-coded item above it. For instances, in another embodiment, stippled rectangles are used that overlay the symbols themselves. This is shown in FIG. 22. In another embodiment, other shapes may be used (e.g. circles instead of rectangles), and transparency (alpha blending) may additionally be used in lieu of stipple patterns.

Net Based

When the value-bearing object to be overlaid is a 'net' (a different type of object with electrical signal semantics in EDA applications), a somewhat different treatment is used. Nets may consist of multiple interconnected segments, and we overlay each of the segments with a slightly oversized border. Nets may also be 'connected by name' in EDA applications, such that the individual net segments aren't always visually connected (e.g. with solder dots). In this case, all net segments are considered, even those that are not visually connected. FIG. 22 above shows some cyan colored nets connecting the 4 transistor symbols together in a certain electrical connectivity.

In that figure, no heat map is applied to the nets, and by default the nets are drawn with a very 'narrow' line style. In FIG. 23 however, there is displayed a different application of the technology, showing a heat map overlay on the electrical nets themselves.

To achieve this, first, a different heatmap application, using a Voltage Based Design Rules Checking (VDRC) assistant within the EDA tool, as shown in FIG. 24. In that application, the quantities being color coded correspond to the electrical voltages which are associated with the electrical interconnect (nets) of the design. Moreover, the VCRC assistant within the EDA tool may require the spacing between nets in an implemented design to be a function of the voltage across those nets (e.g., larger voltages requiring larger spacing). The VDRC assistant, among other things, allows the circuit designer to set/inspect/modify the voltages of individual nets of interest in a tabular fashion on a per-net basis. In various embodiments of the present implementation, these individual nets may be color coded via a heatmap format as discussed herein.

Near the top of the assistant is a toolbar, one of the items of which is used for configuring the VDRC Heatmap application for nets. This time, the heatmap setup is as shown in FIG. 25.

When the circuit designer presses the gradient icon to invoke the Gradient Settings Editor, the editor appears as in FIG. 26. The color histogram at the top shows a wide distribution in electrical net voltages across the design, and low/high values of (0.0, 3.0) respectively have been chosen.

When this setup is applied to a VCO design, a portion of the design with overlaid heat map information is displayed, as shown in FIG. 27. Here various horizontal and vertical net segments can be seen, which also have heat map information overlaid on top of the narrow line-style net objects themselves. In another embodiment, the stipples are intentionally made more visible than the underlying nets. Most of the nets have a dark orange color (relatively large voltage values), one has a blue color (relatively low voltage values), and one has a green color representing a more intermediate voltage level. In another embodiment, alpha blending may again be used in lieu of stipple patterns to achieve transparency. In yet another embodiment, the heat map colors may be rendered as an 'underlay' rather than as overlay.

In FIG. 27, color information is additionally present on the triangular shaped instance objects, which will be discussed further below in the context of Dealing with Hierarchy.

As for the Instance-based Heat Map, for the Net-based heat map, the zoom level/altitude can be changed to see how the heat map is dynamically redrawn at each zoom level (again, oversizing the highlights as necessary relative to their underlying net segments) to maintain high fidelity of information, as shown in images FIG. 28 and FIG. 29.

Note that the image of FIG. 29 is not just a scaled down version of the image of FIG. 27, and the overlays have instead been drawn using a zoom-level specific oversizing to maintain their visual impact. In this example, the presence of the blue and green overlays is still quite visible even among the orange colored overlays.

Dealing with Hierarchy

One of the unique and EDA-specific aspects of the present invention is how it deals with hierarchical designs. In one example, a VCO testbench image is seen in FIG. 30. The circular VCO symbol represents a different level of the design, the schematic for which is shown in FIG. 33.

Note that in FIG. 30, not only is the VCO instance drawn with an Orange stipple overlay, it is drawn with a stipple pattern (backslash) that has a special semantic intent. This pattern conveys that this instance has additional heat map data available in the levels below, the 'worst case' color for which has been determined to be this orange color, and which has been 'propagated up' the design from the underlying levels. As such, the image conveys two important pieces of information to the circuit designer:

There is additional detail in the hierarchy below

The 'worst case' color to be found in the hierarchy below is the orange color

The setup corresponding to the canvas image of FIG. 30 is itself show in FIG. 31.

The Gradient Setup for the 'vds' parameter is as shown in FIG. 32, with the Max value in the data set showing a value of 0.799 volts in dark orange.

The circuit designer can then navigate through the hierarchy using the regular schematic editor functionality, descending various hierarchical levels to inspect the color-coded objects. In FIG. 3, the circuit designer has descended into the VCO instance itself, where additional sub-instances are seen, each representing additional hierarchy. Two of these instances have the same orange color (high 'vds' values somewhere in the hierarchy below) as shown in the top level testbench schematic of FIG. 30, in addition to 4 instances with a blue coloring (low 'vds' values), and one with a green coloring (intermediate value). All of these symbols have the special 'backslash' stipple pattern which indicates there is additional color coded instance-related information below. In another embodiment, a different graphical treatment could be used (for example, surrounding the stipple with a 'halo' or other visual effect).

Descending into one of the orange-highlighted 'vco_buff' instances, the vco_buff schematic of FIG. 34 contains more color-coded instances.

Descending further into one of the orange colored 'invv' instances results with the 'invv' leaf-level schematic of FIG. 35.

This schematic contains a MOS inverter (pair of transistors), and contains no additional hierarchy. The two leaf-level transistor devices are rendered with a different stipple pattern, shown in more detail in FIG. 36. Note that the 'backslash' stippling has now been replaced with a finer mesh, though the same color coding has been used. The circuit designer has now arrived at schematic leaf level showing one of the transistors colored coded (dark orange) with of the 'worst case' values for the 'vds' parameter, as per the color coding setup of FIG. 32.

Stated alternatively, each level of schematic hierarchy has its non-leaf instances color-coded per the 'worst case' or most extreme values found for the parameter of interest in all the hierarchy below that instance. The 'worst case' color encoding is therefore 'bubbled up' through the schematic hierarchy, all the way to the top level. This again gives the circuit designer a quick visual indication of where the trouble spots in a hierarchical design are likely to be, allowing the user to navigate as necessary to see more detail, all the way down to the leaf level.

A similar hierarchical treatment is used for Net-based applications, such as the VDRC application previously discussed. Referring once again to the VDRC Heat Map Setup of FIG. 24 through FIG. 26, we can see a 'worst case' coloring of red in the top level (testbench) schematic of FIG. 37. This time, even though electrical nets are being annotated, we still see that the hierarchical instances are also color coded. Again, it is our 'vco' instance that is color coded in dark red 'backslash' stipple, indicating that somewhere in the hierarchy below it is to be found a net with a corresponding dark red color encoding indicating a very high voltage value. This is a unique and differentiating feature of our solution.

The circuit designer can descend through to the level of the VCO design itself (see FIG. 38), where worst case values can be seen on the amplifier instances.

Further descend operations through the instances with the colors in this example lead to an eventual arrival at a leaf-level schematic, as shown in FIG. 39.

Hierarchical displays of objects utilizing discrete expression color maps according to various embodiments may not be characterized by a known "worst" case color mapping, and accordingly such embodiments may utilize alternative color schemes for hierarchically displaying colors reflecting colored objects of lower-levels within a hierarchy. As shown in the examples of FIGS. 40A-40B, in instances in which all of multiple lower-level objects are annotated with a common color, the higher-level hierarchical shape may be annotated with the color shared among all of the child objects. With specific reference to the example of FIGS. 40A-40B, all of the lower-level objects are annotated with a cyan color (as shown in FIG. 40B), and accordingly the higher level object is similarly annotated with the same cyan color (as shown in FIG. 40A). In the illustrated embodiment, the parent object is annotated with a dashed line to reflect the representation of multiple lower level object.

However, in embodiments in which the lower level objects are annotated with differing colors, such as the configuration of FIGS. 41A-41B, the higher-level object may be annotated with a non-object-specific color (e.g., white), and a dashed configuration (as shown in the example of FIG. 41A) to indicate that multiple lower-level objects are annotated with differing colors (as shown in the example of FIG. 41B). In other embodiments, a multi-color annotation may be shown adjacent to the higher-level object, such as a colored pie-chart as illustrated in FIG. 42, which illustrates the ratio of objects annotated with each color. The size of each portion of the illustrated pie chart reflects the relative number of annotations of the given color contained at lower levels. With reference to the example of FIGS. 41A-41B, one annotation is green and one annotation is orange, and accordingly an example pie chart (as shown in FIG. 42) may be half green and half orange. This pie chart may be shown accompanying the high-level annotation as shown in FIG. 41A.

Dealing with Vector and Vector Bit Objects

Vector instances in circuit design can be thought of as something that looks like a single instance, but are comprised of multiple instances, often (but not always) connected in parallel for additional drive strength, etc.). They are typically assigned names indicating the upper/lower limits of the vector, such as I1<0:7> for an 8-bit instance. Likewise, vector nets can be thought of as 'buses' which are collections of related but electrically distinct signals. Vector nets or buses are common in both analog and digital designs, and particularly in the latter. Vector nets are often drawn in schematics using a wider line-style than the regular scalar nets, and in OA compliant databases, are given names like OUT<0:1>. An example is shown in FIG. 43, with a two-bit bus OUT<0:1> drawn with a wide line style.

Here, the presence of the angle brackets in the name indicates that OUT<0:1> is a two-bit bus, with the bit ranges specified within the angle brackets themselves. This will be understood by those skilled in the art.

This Heat Map application treats Vector Instances and Vector nets by using additional special stipple patterns, such as the thick red pattern shown in the middle right of the VDRC application in FIG. 44. Here a thick net segment named OUT<0:1> is displayed, for which two bus bit 'taps' are created, which are OUT<O> and OUT<1> respectively. While the segments corresponding to the individual bits can be drawn with their own unique color encoding, the special treatment is for the segments that correspond to the multi-bit bus itself. The stipple pattern is chosen so that it renders clearly above the 'thick' underlying bus wire, and doesn't disappear in a 'sea of blue' when viewed from above. In the diagram, the special stipple pattern is displayed, which indicates that this wire segment is representative of multiple values, and the color is chosen as the 'worst case' (corresponding to the largest voltage value) of all the bits in this segment. The details of the special Vector net (aka bus net) stipple are shown in FIG. 45. A similar treatment (using a different stipple pattern) is used for Vector Instances. As for Vector Nets, the color is chosen per the 'worst case' of all the individual Instance Bits themselves. Again, this readily identifies the values of most interest to circuit designers in high altitude zoom settings, so that they can 'drill down' to use other tool features to inspect the individual bit values.

As an example, the VDRC assistant itself also shows the individual bus bits, as shown in FIG. 46. Any of the individual bits can be selected to see the min/max voltages for those bits.

Application Programming Interface (API)

An API is also provided to enable CAD teams to customize or extend the EDA tool to create additional heat map applications, beyond those supplied 'out of the box' by the EDA tool vendor. In a preferred embodiment, the API is in the form of the Tcl language, but other language bindings can be used to expose the functionality without departing from the spirit of the art.

An example in code is shown in the listing of FIG. 47.

The code in FIG. 47 can be written by a CAD team extending the underlying EDA tool, and a brief overview of the functionality follows next. This code sample is with respect to a VDRC application again, but other applications could equally be used.

First (line 1, 2), a SQLite3 database is opened, which contains the underlying data values which are to be back annotated via the heat map scheme. The actual data represented within the database is largely determined by the application.

On line 4, the extreme limits (min, max values) for the 'vMax' expression in the database are queried.

On line 6, a gradient object is created. This is setup to have a bin count of 10 bins, with a starting color corresponding to a color packet called 'density0' (typically dark blue), and an ending color corresponding to a color packet called density100 (typically dark red). It is assumed that the EDA tool is pre-configured with the intermediate color packets. The gradient object is additionally associated with the expression 'vMax' or the Maximum VDRC Voltage, and the previously determined min/max limits.

On line 8, the gradient bins are computed using the information in the 'voltage' table within the SQLite3 database, and the supplied gradient object '$gr'.

On line 10, a color annotator is created for the current application design context (hierarchical level), given a user-defined application name of 'vdrc', and again associated with the 'voltage' table in the given SQLite3 database. The annotator is configured to use the previously created gradient object, and is further instructed to be a net-based annotator. This step is sufficient to enable the heat map coloring to take place.

Lines 12 and 15 retrieve and destroy the color annotator object respectively, to prepare for the next application.

Line 17 and 18 set up a Boolean expression for the next application. Here, the expression 'vMax>1' is to be color coded with the 'density0' color.

Lines 19 and 20 set up a collection (remember, we support multiple expressions at once), containing this single expression object, and in line 22 the color annotator is enabled to render the colors as appropriate.

By using code like that shown in the listing of FIG. 47, and connecting it to various SQL Database tables containing various numerical quantities of interest, the CAD user can create (via Tcl scripts) their own custom Heat Map applications, thus extending the capability of the EDA tool itself.

Detailed Description Technology Support—General Computer Explanation

FIGS. 49A, 49B and 49C are simplified block diagrams of a computer system suitable for use with embodiments of the technology, as well as circuit design and circuit embodiments of the technology.

In FIG. 49A, computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's Mac OS, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 49A is intended only as one example for purposes of illustrating the preferred embodiments. Many other configurations of computer system 3110 are possible having more or less components (or other objects) than the computer system depicted in FIG. 49A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network.

The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 3122 may include an alphanumeric keyboard, a keypad, pointing devices such as a mouse, trackball, touchpad, stylus, or graphics tablet, a scanner, a touchscreen incorporated into the display, audio input devices such as voice recognition systems, or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3110 or onto communication network 3118. User interface input devices typically allow a user to select objects, icons, text and the like that appear on some types of user interface output devices, for example, a display subsystem.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 49B shows a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 49C signifies an integrated circuit 3190 created with the described technology that includes one or more cells selected, for example, from a cell library.

Detailed Description Technology Support—Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMs, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Detailed Description Technology Support—EDA System/Workflow Explanation

FIG. 48 illustrates various processes performed in the design, verification, and fabrication of an item of manufacture such as an integrated circuit using software tools with a computer, and possibly special hardware-assisted tools, to transform and verify design data and instructions that represent the integrated circuit. These processes start with the generation of a product idea (110) with information supplied by a designer, information which is transformed during a process to create an item of manufacture (referred to herein as a design or device) that uses EDA software tools (112), which may also be signified herein as EDA software, as a design tool or a verification tool. When the design is finalized, it can be taped-out (134), which typically is when artwork (e.g., geometric patterns) for the integrated circuit is sent to a fabrication facility to manufacture the mask set, which is then used to manufacture the integrated circuit. After tape-out, a semiconductor die is fabricated (136) and packaging and assembly processes (138) are performed, which result in the finished integrated circuit (140) which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses EDA software tools (112) includes processes 114-132, which are described below. This design flow description is for illustration purposes only and is not meant to limit the present disclosure. For example, an actual integrated circuit design may require a designer to perform the design operations in a different sequence than the sequence described herein.

During system design (114), a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif. that can be used at this stage include: Model Architect, Saber, System Studio, and Designware products.

During logic design and functional verification (116), modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (®="Registered Trademark").

During synthesis and design for test (118), HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (120), the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning (122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation (124), the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction (126), the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification (128), the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement (130), geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation (132), the tape-out data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software (112).

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

That which is claimed:

1. A system for generating a graphical visualization of an integrated circuit (IC) design, the system comprising:
   one or more memory storage areas; and
   one or more processors collectively configured to:
   receive user input selecting one or more parameters of interest;
   generate a graphical representation of an IC design at a first zoom level comprising a plurality of objects visible within differing zoom level hierarchies, wherein the plurality of objects comprises at least one object not visible at the first zoom level of the graphical representation of the IC design and wherein the at least one object is located at a corresponding location within the IC design;
   apply one or more visual overlays over the corresponding location of the graphical representation of the IC design at the first zoom level based at least in part on at least one parameter of the at least one object matching at least one of the one or more parameters of interest; and
   wherein the one or more visual overlays covers a plurality of visually proximate objects existing within different zoom level hierarchies at the corresponding location of the at least one object, and wherein the at least one object satisfies a defined criteria for display of the one or more visual overlays relating to at least one of the one or more parameters of interest.

2. The system for generating a graphical visualization of an IC design of claim 1, wherein the at least one object is identified as associated with a value identified as an outlier for one or more of the parameters of interest.

3. The system for generating a graphical visualization of an IC design of claim 1, wherein the one or more parameters of interest comprise a plurality of parameters of interest, and wherein the at least one object satisfies a defined criteria relating to a worst-case value in one of the plurality of parameters of interest.

4. The system for generating a graphical visualization of an IC design of claim 1, wherein the one or more visual overlays are sized based on a size of one or more of the plurality of objects.

5. The system for generating a graphical visualization of an IC design of claim 1, wherein the one or more visual overlays are sized based at least in part on a minimum overlay size.

6. The system for generating a graphical visualization of an IC design of claim 1, wherein the plurality of visually proximate objects comprise at least one net.

7. The system for generating a graphical visualization of an IC design of claim 1, wherein at least a portion of the plurality of objects are represented within a hierarchical symbol comprising the at least a portion of the plurality of objects.

8. A computer-implemented method for generating a graphical visualization of an integrated circuit (IC) design, the method comprising:
receiving user input selecting one or more parameters of interest;
generating a graphical representation of an IC design at a first zoom level comprising a plurality of objects visible at differing zoom level hierarchies, wherein the plurality of objects comprises at least one object not visible at the first zoom level of the graphical representation of the IC design and wherein the at least one object is located at a corresponding location within the IC design;
applying one or more visual overlays at the corresponding location of the graphical representation of the IC design at the first zoom level based at least in part on at least one parameter of the at least one object matching at least one of the one or more parameters of interest; and
wherein the one or more visual overlays covers a plurality of visually proximate objects existing within different zoom level hierarchies at the corresponding location of the at least one object, and wherein the at least one object satisfies a defined criteria for display of the one or more visual overlays relating to at least one of the one or more parameters of interest.

9. The computer-implemented method for generating a graphical visualization of an IC design of claim 8, wherein the at least one object is identified as associated with a value identified as an outlier for one or more of the parameters of interest.

10. The computer-implemented method for generating a graphical visualization of an IC design of claim 8, wherein the one or more parameters of interest comprise a plurality of parameters of interest, and wherein the at least one object satisfies a defined criteria relating to a worst-case value in one of the plurality of parameters of interest.

11. The computer-implemented method for generating a graphical visualization of an IC design of claim 8, wherein the one or more visual overlays are sized based on a size of one or more of the plurality of objects.

12. The computer-implemented method for generating a graphical visualization of an IC design of claim 8, wherein the plurality of visually proximate objects comprise at least one net.

13. The computer-implemented method for generating a graphical visualization of an IC design of claim 8, wherein at least a portion of the plurality of objects are represented within a hierarchical symbol comprising the at least a portion of the plurality of objects.

14. A computer-implemented method for generating a graphical visualization of an integrated circuit (IC) design, the method comprising:
receiving user input selecting one or more parameters of interest;
generating an interactive graphical representation of an IC design at a first zoom level comprising a plurality of objects within a graphical display, wherein the interactive graphical representation of the IC design comprises one or more first visual overlays over at least one object visible within the interactive graphical representation of the IC design at a first location at the first zoom level and wherein the one or more first visual overlays have a first size corresponding to the at least one object;
receiving user input zooming the interactive graphical representation of the IC design to a second high-altitude zoom level, wherein the at least one object is not visible at the second high-altitude zoom level;
dynamically reconstructing the interactive graphical representation of the IC design to have one or more second visual overlays over the first location of the graphical representation of the IC design at the second high-altitude zoom level, wherein the one or more second visual overlays have a second size independent of a size of the at least one object.

15. The computer-implemented method for generating a graphical visualization of an IC design of claim 14, wherein dynamically reconstructing the interactive graphical representation of the IC design comprises shrinking each of the plurality of objects relative to the graphical display.

16. The computer-implemented method for generating a graphical visualization of an IC design of claim 15, wherein the second size of the one or more second visual overlays are selected based at least in part on a minimum visual overlay size.

17. The computer-implemented method for generating a graphical visualization of an IC design of claim 15, further comprising:
selecting a second visual overlay for display relative to a single one of a plurality of visually proximate objects within the dynamically reconstructed interactive graphical representation of the IC design, wherein the single one of the plurality of visually proximate objects satisfies a defined criteria relating to at least one of the one or more parameters of interest.

18. The computer-implemented method for generating a graphical visualization of an IC design of claim 15, further comprising:
selecting a particular visual overlay for display relative to a single one of a plurality of visually proximate objects within the dynamically reconstructed interactive graphical representation of the IC design, wherein the single one of the plurality of visually proximate objects satisfies a defined criteria relating to at least one of the one or more parameters of interest;
generating one or more ancillary visual overlays for display relative to corresponding ones of the plurality of visually proximate objects; and
layering the particular visual overlay over the one or more ancillary visual overlays in the graphical display.

19. A system for generating a graphical visualization of an integrated circuit (IC) design, the system comprising:
one or more memory storage areas; and
one or more processors collectively configured to:
receive user input selecting one or more parameters of interest;
generate a high-altitude graphical representation of an IC design comprising a plurality of objects, wherein the IC design comprises at least one object positioned at a first location within the IC design and wherein the at least one object is not visible within the high-altitude graphical representation of the IC design;
apply one or more visual overlays over the first location within the IC design based at least in part on the user input selecting one or more parameters of interest by:
generating a visual overlay having a defined size; and overlaying the visual overlay over the first location of the graphical representation of the IC design, wherein the visual overlay is centered relative to the at least one object.

20. The system for generating a graphical visualization of an IC design of claim 14, wherein the plurality of objects comprise a plurality of visually proximate objects, and wherein:

applying one or more visual overlays further comprises:
select a visual overlay for display relative to a single one of the plurality of visually proximate objects, wherein the single one of the plurality of visually proximate objects satisfies a defined criteria relating to at least one of the one or more parameters of interest.

21. The system for generating a graphical visualization of an IC design of claim 14, wherein the plurality of objects comprise a plurality of visually proximate objects, and wherein:

applying one or more visual overlays further comprises:
select a first visual overlay for display relative to a first one of the plurality of visually proximate objects, wherein the first one of the plurality of visually proximate objects satisfies a defined criteria relating to at least one of the one or more parameters of interest;
generate one or more second visual overlays for display relative to corresponding ones of the plurality of visually proximate objects; and
layer the first visual overlay over the one or more second visual overlays in the graphical display.

\* \* \* \* \*